United States Patent [19]

Hettinger, Jr.

[11] 4,454,025
[45] Jun. 12, 1984

[54] PASSIVATING HEAVY METALS IN CARBO-METALLIC OIL CONVERSION

[75] Inventor: William P. Hettinger, Jr., Russell, Ky.

[73] Assignee: Ashland Oil, Inc., Ashland, Ky.

[21] Appl. No.: 263,395

[22] Filed: May 13, 1981

[51] Int. Cl.³ .......................................... C10G 11/18
[52] U.S. Cl. .................................. 208/120; 208/113; 208/121; 502/22
[58] Field of Search .................. 208/52 CT, 113, 120, 208/121; 252/411 R

[56] References Cited

U.S. PATENT DOCUMENTS

| | | | |
|---|---|---|---|
| 2,471,131 | 5/1947 | Viles | 208/113 |
| 2,579,123 | 12/1951 | Pardee | 252/412 |
| 2,600,360 | 6/1952 | Grosse | 252/416 |
| 3,409,541 | 11/1968 | Flanders | 208/120 |
| 3,471,410 | 10/1969 | Oleck et al. | 252/454 |
| 3,696,025 | 10/1972 | Chessmore et al. | 208/113 |
| 3,711,422 | 1/1973 | Johnson et al. | 252/414 |
| 3,977,963 | 8/1976 | Readal et al. | 208/120 |
| 4,022,714 | 5/1977 | Elliott, Jr. | 252/455 Z |
| 4,025,458 | 5/1977 | McKay | 252/416 |
| 4,101,417 | 7/1978 | Mitchell et al. | 208/120 |
| 4,111,845 | 9/1978 | McKay | 252/455 Z |
| 4,141,858 | 2/1979 | McKay | 252/439 |
| 4,143,086 | 3/1979 | Carle et al. | |
| 4,146,463 | 3/1979 | Radford et al. | 208/120 |
| 4,153,534 | 5/1979 | Vasalos | 208/120 |
| 4,153,535 | 5/1979 | Vasalos et al. | 208/120 |
| 4,162,213 | 7/1979 | Zrinscak et al. | 208/89 |
| 4,256,564 | 3/1981 | Roberts et al. | 208/120 |
| 4,259,175 | 3/1981 | McArthur | 208/113 |
| 4,264,434 | 4/1981 | Bertus et al. | 208/120 |
| 4,268,376 | 5/1981 | Foster | 208/120 |
| 4,280,898 | 7/1981 | Tatterson et al. | 208/119 |
| 4,283,274 | 8/1981 | Bertus et al. | 208/120 |
| 4,289,608 | 9/1981 | McArthur | 208/121 |
| 4,297,110 | 10/1981 | Feldman | 44/66 |
| 4,308,129 | 12/1981 | Gladrow et al. | 208/120 |
| 4,317,713 | 3/1982 | Burk, Jr. et al. | 208/113 |
| 4,319,983 | 3/1982 | Yoo | 208/114 |
| 4,331,533 | 5/1982 | Dean et al. | 208/113 |
| 4,332,674 | 6/1982 | Dean | 208/120 |
| 4,336,160 | 6/1982 | Dean et al. | 252/417 |
| 4,337,144 | 6/1982 | Yoo | 208/114 |
| 4,341,624 | 7/1982 | Myers | 208/120 |

OTHER PUBLICATIONS

Shankland & Schmitkons "Determination of Activity and Selectivity of Cracking Catalyst" Proc. API 27 (III) 1947, pp. 57-77.

Primary Examiner—Delbert E. Gantz
Assistant Examiner—G. E. Schmitkons
Attorney, Agent, or Firm—Richard C. Willson, Jr.; Carl D. Fransworth

[57] ABSTRACT

A process for economically converting carbo-metallic oils to lighter products. The carbo-metallic oils contain 650° F. plus material which is characterized by a carbon residue on pyrolysis of at least about 1 and a Nickel Equivalents of heavy metals content of at least about 4 parts per million. This process comprises flowing the carbo-metallic oil together with particulate cracking catalyst through a progressive flow type reactor having an elongated reaction chamber, which is at least in part vertical or inclined, for a predetermined vapor riser residence time in the range of about 0.5 to about 10 seconds, at a temperature of about 900° to about 1400° F., and under a pressure of about 10 to about 50 pounds per square inch absolute sufficient for causing a conversion per pass in the range of about 50% to about 90% while producing coke in amounts in the range of about 6 to about 14% by weight based on fresh feed, and laying down coke on the catalyst in amounts in the range of about 0.3 to about 3% by weight. The spent, coke-laden catalyst is separated from the stream of hydrocarbons formed by vaporized feed and resultant cracking products and regenerated in one or more regeneration beds in one or more regeneration zones by burning the coke on the spent catalyst with oxygen. The regenerated catalyst is recycled to the reactor and contacted with fresh carbo-metallic oil. Compounds of aluminum, silicon, zirconium or titanium or a mixture of two or more of those metal compounds is added to the catalyst in an amount and in a form sufficient to reduce the amount of gas formation caused by heavy metals deposited on the catalyst during the conversion reaction.

15 Claims, 7 Drawing Figures

PASSIVATING HEAVY METALS IN CARBO-METALLIC OIL CONVERSION

TECHNICAL FIELD

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

BACKGROUND ART

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variactions have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavoir, while containing relatively large quantities of coke precursors, is referred to herein as a carbon-metallic oil, and represents a particular challenge to the petroleum refiner.

In general, the coke-forming tendency or coke precursor content of an oil can be ascertained by determining the weight percent of carbon ramaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed. The present invention is concerned with the use of hydrocarbon feedstocks which have higher Conradson carbon values and thus exhibit substantailly greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in *Oil and Gas Journal*, page 143, Oct. 23, 1961) in which the content of each metal present is expressed in parts per million of such metal, as metal, on a weight basis, based on the weight of feed:

Nickel Equivalents = $Ni + (V/4.8) + (Fe/7.1) + (Cu/1.23)$

According to conventional FCC practice, the heavy metal content of feedstock for FCC processing is controlled at a relatively low level, e.g. about 0.25 ppm Nickel Equivalents or less. The present invention is concerned with the processing of feedstocks containing metals substantially in excess of this value and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and produce vapors in a fluidized bed.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commerically, the art has continued is arduous search for suitable modifications or alternatives to the FCC process which would permit commercially successful operation on reduced crude and the like. During this period a number of proposals have been made; some have been used commercially to a certain extent.

Several proposals involve treating the heavy oil feed to remove the metal therefrom prior to cracking, such as by hydrotreating, solvent extraction and complexing with Friedel-Crafts catalysts, but these techniques have been criticized as unjustified economically. Another proposal employs a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical papers.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that a fraction of crude oil which boils at about 650° F. to about 1,000° F., such fractions being relatively free of coke precursors and heavy metal contamination. Such feedstock, known as "vacuum gas oil" (VGO) is generally prepared from crude oil by distilling off the fractions boiling below about 650° F. at atmospheric pressure and then separating by further vacuum distillation from the heavier fractions a cut boiling between about 650° F. and about 900° to 1025° F.

The vacuum gas oil is used as feedstock for conventional FCC processing. The heavier fractions are normally employed for a variety of other purposes, such as for instance production of asphalt, residual fuel oil, 190 6 fuel oil, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process, but the long standing recognition of the desirability of cracking carbo-metallic feedstocks, along with the slow progress of the industry toward doing so, show the continuing need for such a process. It is believed that the present process is uniquely advantageous for dealing with the problem of treating such carbo-metallic oils in an economically and technically sound manner.

One method of cracking these high boiling fractions, name Reduced Crude Conversion (RCC) after a particularly common and useful carbo-metallic feed, is disclosed in copending application Ser. No. 94,092 (now U.S. Pat. No. 4,332,673) and Ser. No. 94,216 (now U.S. Pat. No. 4,341,624), each filed Nov. 14, 1979, for "Carbo-Metallic Oil Conversion" and each being incorporated herein by reference. The oils disclosed as capable of being cracked by the methods of these applications are carbo-metallic oils of which at least about 70 percent boils above 650° F. and which contain a carbon residue on pyrolysis of at least about 1 and at least about 4 parts per million of nickel equivalents of heavy metals. Examples of these oils are crude oils, topped crudes, reduced crudes, residua, and extracts from solvent deasphalting.

The cracking reaction for the method disclosed in application Ser. No. 94,216 is sufficiently severe to convert 50% or more of the feedstock to gasoline per pass and produce coke in the amount of 6 to 14% by weight based on weight of fresh feed. In a typical RCC cracking process the ratio of weight of catalyt to weight of feedstock is from about 3 to about 18, coke is laid down on the catalyst in amounts in the range of about 0.3 to about 3 percent by weight based on the weight of the catalyst, and heavy metals accumulate on the catalyst to a concentration of from about 3000 to about 30,000 ppm nickel equivalents.

During the cracking process, the heavy metal inventory of the feed transfers almost quantitatively from the feedstock oil to the catayst particles. These heavy metals tend to deposit near the surface of the catalyst matrix of each particle where they can readily catalyze undesirable dehydrogenation and methyl clipping reactions. It is to be understood, however, that a significant proportion of these metals may also deposit on interior surfaces of the catalyst matrix where they can also cause such undesirable cracking reactions.

For purposes of this application, the term "heavy metals" refers to nickel, vanadium, copper and iron, although trace amounts of other hevy metal elements may sometimes be present. The total amount of heavy metals in the feed is comprised principally of nickel and vanadium (90 or more weight percent based on total heavy metals). The undesirable dehydrogenation and methyl clipping reactions catalyzed by these metals form hydrogen and methane gases and increase the amount of coke deposited on the catalyst. The formation of increasing amounts of hydrogen and methane as heavy metals build up on the catalyst increases the amount of gaseous material that must be handled by refinery gas treating and compression equipment and decreases catalyst selectivity for gasoline production, i.e., the volume percent yield of gasoline boiling range products is reduced. Vanadium, and to a lesser extent nickel, may also migrate to and poison the catalytic acid sites of the catalyst. Poisoning of the acid sites decreases the level of conversion and may thereby also decrease the yield of gasoline boiling range products, as well as the heavier cycle oil products.

The unusually large amount of coke which deposits on the catalyst in carbo-metallic oil processing presents critical problems, one problem arising from the fact that the reactions in the regenerator which convert coke to water, carbon monoxide and carbon dioxide are highly exothermic. Using a carbo-metallic feed with its unusually high content of coke precursors as compared to FCC feeds, can increase the amount of coke burned in the regenerator and the temperature in the regenerator to the point that regeneration temperatures become excessive if there is thorough burning of coke. Excessive temperatures can permanently deactivate the catalyst and/or damage the regenerating equipment.

The heat of combustion of coke depends upon the concentration of hydrogen in the coke and the ratio of $CO_2$ to CO in the products of combustion. Carbon produces 13,910 BTU per pound when burned to $CO_2$ and only 3,962 BTU per pound when burned to CO. Hydrogen produces 61,485 BTU per pound when burned to $H_2O$. The heats of combustion of coke for three representative levels of hydrogen and four different ratios of $CO_2/CO$ are given in the following table:

TABLE I

| | Heat of Combustion BTU/lb Coke | | |
|---|---|---|---|
| | Percent Hydrogen | | |
| $CO_2/CO$ Ratio | 2 | 4 | 6 |
| 0.5 | 8,362 | 9,472 | 10,582 |
| 1.0 | | 11,038 | 12,083 |
| 3.0 | | | 14,446 |
| 4.0 | 12,912 | | 14,894 |

These problems encountered in regenerating catalysts coated with a high concentration of coke may be exacerbated when catalysts of the zeolite or molecular sieve type are used.

These catalysts, which are crystalline aluminosilicates made up of tetra-coordinated aluminum atoms associated through oxygen atoms with silicon atoms in the crystalline silica-alumina catalysts in respect to loss of cracking activity upon extended exposure to high temperatures. Also, they have been shown to be more adversely affected by coke in respect to loss of cracking activity, than are certain other catalysts, such as for example, the non-zeolite, silica-alumina catalysts.

U.S. patent application Ser. Nos. 94,091 (now U.S. Pat. No. 4,299,687) and 94,227, (now U.S. Pat. No. 4,354,923) filed Nov. 14, 1979, disclose processes for the conversion of carbo-metallic oils to liquid fuel in which various regeneration techniques are employed that assist in controlling the heat load in the regeneration step, each of said applications being incorporated herein by reference. One method of controlling the heat load in the regenerator is disclosed in U.S. patent application Ser. No. 251,032 for "Addition of Water to Regenerator Air" filed Apr. 3, 1981, by George D. Myers, et al., and the disclosure of this application is herein incorporated by reference.

It is thought that the ratio of $CO_2$ to CO may be decreased to no more than about 4 and preferably to less than about 3 in order to reduce the amount of energy released within the regenerator, while optionally providing a flue gas high enough in CO content to be a useful fuel. The $CO/CO_2$ ratio may be increased by providing chlorine in an oxidizing atmosphere within the regenerator the concentration of chlorine preferably being in the range of about 100 to about 400 ppm. This method of increasing the $CO/CO_2$ ratio is disclosed in copending applications Ser. No. 246,751 filed Mar. 23, 1981 (now U.S. Pat. No. 4,376,696), for "Addition of $MgCl_2$ to Catalyst" and Ser. No. 246,782 (now U.S. Pat. No. 4,375,404 filed Mar. 23, 1981, for "Addition of Chlorine to Regenerator", both in the name of George D. Myers. The contents of these applications are herein incorporated by reference.

As will be appreciated the carbo-metallic oils can vary widely in their Conradson carbon content. Such varying content of carbon residue in the feedstock, along with variations in riser operating conditions such as catalyst to oil ratio and others, can result in wide variations of the percent coke found on the spent catalyst. Accordingly, where the feed and riser operating conditions are such as to produce rather large coke yields, necessitating the burning of very substantial amounts of coke from the catalyst in regeneration, such as at least about 0.5 weight percent based on the catalyst, or more, additives such as those of the present invention may prove useful in controlling the heat load in the regenerator.

SUMMARY OF THE INVENTION

Accordingly, one object of this invention is to provide a catalytic cracking method for converting carbo-metallic oils to liquid fuels wherein the amount of hydrogen and methane gases generated within the conversion zone is reduced.

Another object of the invention is to provide a carbo-metallic oil conversion process involving controlling the amount of light gases produced within a riser reactor wherein the heavy metals level on the conversion catalyst is at least about 3000 ppm Nickel Equivalents.

Still another object of the invention is to provide a carbo-metallic oil conversion process wherein the ratio of $CO/CO_2$ in the regenerator flue gases is increased and the amount of coke produced in the conversion zone is decreased so as to affect substantially complete combustion of coke in the regenerator.

A further object of the invention is to provide a carbo-metallic oil conversion process which includes provision for passivating heavy metals deposited on the catalyst by the conversion reaction so as to increase gasoline selectivity and the volume percent yield of gasoline boiling range products.

A still further object of the invention is to provide a carbo-metallic oil conversion process which includes provision for passivating heavy metals as they are deposited on the catalyst during repeated conversion and regeneration cycles so as to increase both conversion and gasoline selectivity, and thereby provide increased volume percent yields of both gasoline boiling range products and liquid fuels boiling above the gasoline range.

In accordance with this invention a process is provided for converting carbo-metallic feedstocks containing 650° F. material and having a residue on pyrolysis of at least about one and containing at least about four ppm nickel equivalents of heavy metals comprising bringing said feedstock in contact with a cracking catalyst in a progressive flow reactor under conditions whereby light products and coke are formed and coke and heavy metals deposit onto the catalyst. The spent catalyst is regenerated by contacting it with an oxygen-containing gas under conditions whereby at least a portion of said coke is converted to carbon oxides and the regenerated catalyst is recycled to the reactor for contact with fresh feed.

In order to decrease or "passivate" the adverse catalytic activity of heavy metals accumulating on the cracking catalyst, the catalyst is preferably treated with a compound of aluminum or silicon, or a combination of such compounds. Similar compounds of certain other metals may also be used as described hereinafter. While not intending to be bound by any one theory or hypothesis for the improvements realized, it is believed that these additive metals of the invention form oxides or interact with the heavy metals to form spinels which coat exposed surfaces of heavy metal deposits at the high temperatures and oxidizing conditions in the regenerator. For example, in the regenerator, the aluminum salts of the invention form aluminum oxide or interact with the heavy metals to form spinels comprised of nickel, vanadium, iron and/or copper aluminates. The aluminum oxide and/or aluminate spinels coat the heavy metal deposits so as to passivate the activity of those metals toward adverse cracking reactions that produce hydrogen, methane and coke. The aluminum and other additive metal coatings are relatively inert and will remain substantially in their oxide form during the relatively brief time that the catalyst is transported through the reducing environment of the conversion zone. It is preferable to treat fresh catalyst with the metal additive by introducing it to the riser along with the oil feed so that the additive metal is present as the heavy metals deposit on the catalyst and equilibriate at levels dependent upon the rate of catalyst replacement. In this way, the metal additive will be deposited on the catalyst in intimate admixture with the heavy metal deposits and can equilibrate at a level sufficient to effectively coat or otherwise tie up the heavy metals.

The invention further provides a method for conversion of carbo-metallic oils wherein the heat generated within the regenerator can be reduced by decreasing the ratio of $CO_2$ to CO to a relatively low level, preferably to about 4 and more preferably to about 3. This helps achieve a desirable heat balance since the formation of CO produces less heat than does the formation of $CO_2$. The $CO_2/CO$ ratio is decreased by adding a compound containing both the metal additive and chlorine, e.g., a metal chloride, which forms a chlorine component in the regenerator. Although the chlorine component is referred to herein as "chlorine", it may be in an ionic or molecular form or free of or combined with oxygen. This chlorine component decreases the $CO_2/CO$ ratio and helps control heat within the regenerator as described in copending application Ser. No. 246,751 (now U.S. Pat. No. 4,376,696) in the name of George D. Myers, filed on Mar. 23, 1981, which application is incorporated herein by reference. Chlorine compounds of the metal additives of the invention are particularly useful for processing feedstocks having a Conradson carbon value of at least about 1, are more particularly useful for processing feedstocks having a Conradson carbon value of at least about 2, and are especially useful for processing feedstocks having Conradson carbon contents greater than about 6. The invention is thus also useful in meeting the heat removal requirements involved in regenerating catalyst which has been used in cracking carbo-metallic oils containing high concentrations of coke precursors as well as heavy metals.

Depending on how the process of the invention is practised, one or more of the following additional advantages may be realized. If desired, and preferably, the process may be operated without added hydrogen in the reaction chamber. If desired, and preferably, the process may be operated without prior hydrotreating of the feed and/or without other process of removal of asphaltenes or metals from the feed, and this is true even where the carbo-metallic oil as a whole contains more than about 4, or more than about 5 or even more than about 5.5 ppm Nickel Equivalents by weight of heavy metal and has a carbon residue on pyrolysis greater than about 1% or greater than about 2% by weight. Moreover, all of the converter feed, as above described, may be cracked in one and the same conversion chamber. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

While the reactions which take place on the catalyst are not known, it is hypothesized that an additive metal compound of the invention may itself coat deposits of heavy metals. When the additive metal compound reaches the regenerator, an oxide of the additive metal if formed, either by decomposition of the additive compound directly to the metal oxide or by decomposition of the additive compound to the free metal which is then oxidized under the regenerator conditions. Spinels of binary metallic oxides may then form at the additive metal to heavy metals interface.

Deposits of additive metal oxides on to the catalyst, as they are formed, are retained on and recycled with the catalyst particles through the reactor and regenerator. Although the additive metal oxides recycle with the catalyst particles, a portion thereof constantly leaves the system with the catalyst fines so that the additive metal compounds must be periodically or continuously replenished. For a typical refining process, the quantity of additive metal needed in the feed to passivate the heavy metals content of the feed itself is usually sufficient to also replace the metal additive oxides leaving the system with the catalyst.

Unexpectedly, if the additive metal compound is a chloride and about the same amount of additive as needed in the feed is introduced into the regenerator, either in place of or as a supplement to, additive in the feed, the rate of additive addition is also sufficient to provide a high enough concentration of chlorine in the regenerator to increase the $CO/CO_2$ ratio and reduce the heat load on the regenerator. The chlorine formed in the regenerator must be continuously replenished because it does not recycle but is carried from the system with the flue gases. The addition of an additive metal chloride to the reactor will not effect the $CO/CO_2$ ratio because the chlorine formed will pass out of the reactor with the gaseous hydrocarbon products and will not appear in the regenerator.

BRIEF DESCRIPTION OF THE DRAWINGS

FIGS. 4, 5, 6 and 7 are schematic diagrams illustrating different apparatus and process arrangements for treating a slip stream of regenerated catalyst with metal additives of the invention at near ambient conditions.

BEST AND OTHER ILLUSTRATIVE MODES FOR CARRYING OUT THE INVENTION

Figure 1:
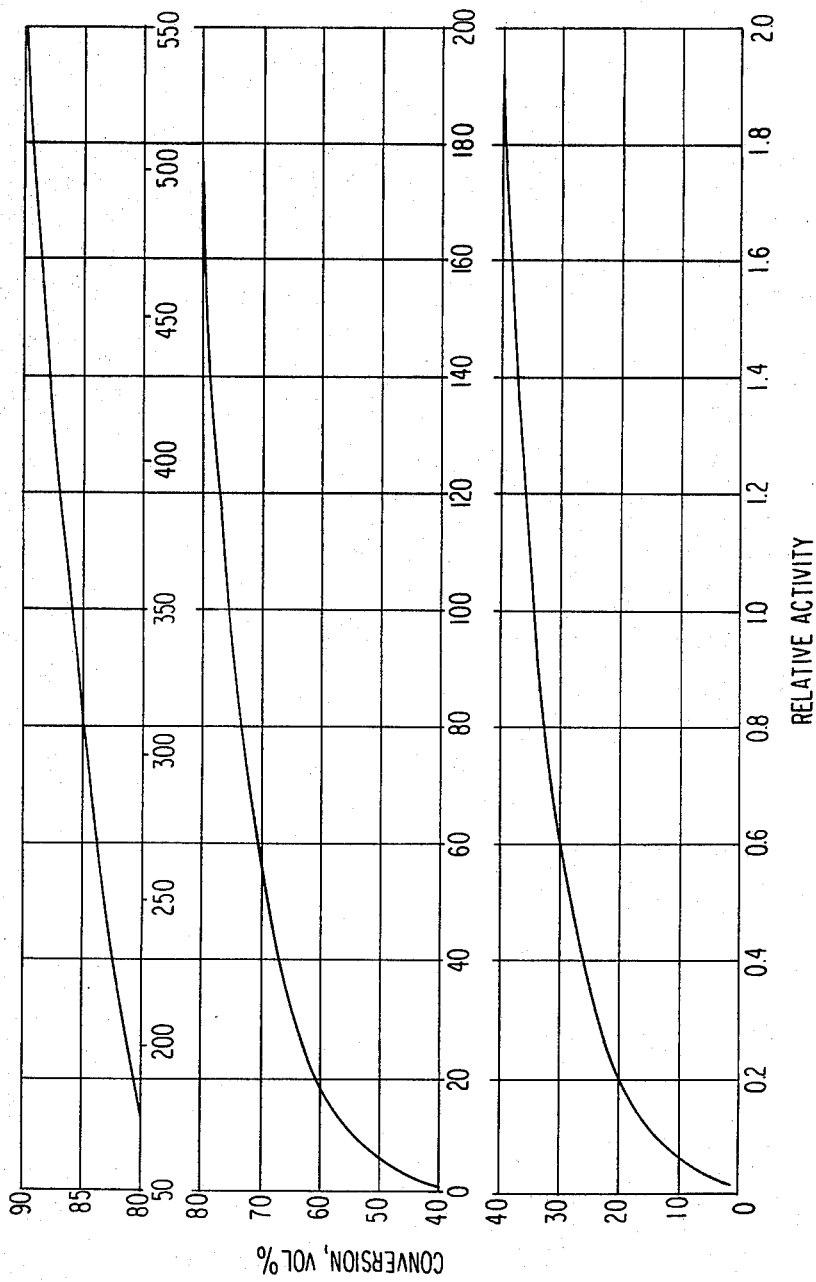
FIG. 1 is a graph showing the relationship between catalyst relative activity and volume percent MAT conversion.

It is not proposed to define the exact mechanism for passivating the heavy metals deposited on the catalyst, but it is believed that the metal compounds of this invention form oxides and/or spinels which coat exposed surfaces of the heavy metal deposits at the temperatures and oxidizing conditions encountered in the regeneration zone. The atomic ratio of additive metal to total heavy metals on the catalyst should be at least 1.0, preferably 1.0 to 4.0, more preferably 1.5 to 3 and most preferably about 2.0. It is preferable to maintain in the feed these same atomic ratios of additive metal to total heavy metals so that when the heavy metals inventory of the feed deposits on the catalyst, it will be intimately mixed with the additive metal in the atomic ratio desired. The preferred additive metals for coating heavy metals on the catalyst are aluminum and silicon. Because the atomic weights of these metals differ relative to the atomic weights of nickel and vanadium, which for practical purposes comprise the total heavy metals inventory, the amount of additive metal needed relative to heavy metals on a weight basis differs significantly from the atomic ratios specified above. Thus, a 1:1 atomic ratio is equivalent to about a 0.5 weight ratio of either aluminum or silicon to nickel plus vanadium. Multiples of the 1:1 atomic ratio require the same multiple of the weight ratio. For example, a 2:1 atomic ratio requires about a 1.0 aluminum or silicon to nickel plus vanadium weight ratio.

The metal additives of the invention are preferably introduced directly into the hydrocarbon conversion zone, preferably near the bottom of a riser reactor, so that the additive metal compound will be deposited on the catalyst along with the heavy metals in the feed. This provides an intimate mixture of additive metal and heavy metals and is believed to be one of the most effective methods for passivating heavy metals accumulating on the catalyst as it equilibrates. The additive metal compound is introduced into the riser by mixing it with the feed in an amount sufficient to give the desired atomic ratio between the metal component of the additive compound and the heavy metals in the feed, the minimum and preferred ratios both in the feed and on the catalyst being as defined above.

Where the metal additive is introduced into the riser along with the feed, it may be an organo-metallic compound soluble in the hydrocarbon feed or in a hydrocarbon solvent miscible with the feed. Suitable solvents are Virgin Gas Oil (VGO), Light Cycle Oil (LCO), Heavy Gas Oil (HGO), naphtha, alcohols, and aromatic and other organic solvents. The preferred organo-metallic compounds are relatively inexpensive and include the acetates, alcoholates such as the isopropoxides, stearates, phenolates, naphtenates, esters, carboxylates, dienyl sandwich compounds, and the like. Examples of such organo-metallic compounds are silicic acid; aluminum isopropoxide, $Al(C_3H_7O)_3$; aluminum acetate, $Al(C_2H_3O_2)_3$; and aluminum alcoholates, $Al(OR)_3$, silanes, $Si(R)_4$ and silicates $Si(OR)_4$ where "R" is an alkyl or aryl group.

The additive metal compounds may also be introduced directly into the conversion system as particulate solids or as aqueous solutions of water soluble inorganic salts, such as the acetates, chlorides, nitrates, sulfates, sulfites and/or carbonates of the additive metals.

Whether introduced as an organo-metallic compound or an inorganic compound and wehther introduced as particulate solids or a liquid solution, the additive metal compounds may be introduced into components of the conversion system other than the reactor, such as the regenerator, coked catalyst stripper, regenerated catalyst stripper, regenerated catalyst standpipe, catalyst disengaging vessel, and/or conduits leading to or from such components. In any event, the catalyst at the time of treatment should contain preferably less than about 0.5, more preferably less than about 0.25 and most preferably less than about 0.05 weight percent coke based on the weight of catalyst.

If the additive metal compound is a chloride or otherwise contains chlorine, it is preferably introduced into the regenerator or another component conveying gases to the regenerator so that gaseous chlorine generated when the additive metal oxide is formed is available to decrease the $CO_2/CO$ ratio and thereby help control the heat generated by the exothermic reactions in the catalyst regeneration zone or zones. The rate of addition of the additive metal and chlorine compound is chosen so that the chlorine concentration in the regenerator flue gases is at least about 100 ppm since significantly lower concentrations, as for example 50 ppm, do not appear to significantly affect the $CO_2/CO$ ratio. However, factors such as cost and environmental considerations establish a preferred upper limit to the chlorine concentration at about 400 ppm. Therefore, the concentration of chlorine as measured in the regenerator flue gases is preferably in the range from about 100 to about 400 ppm, and most preferably in the range from about 100 to about 300 ppm based on the total weight of flue gases leaving the regenerator. An additive compound addition rate sufficient to provide about 2:1 atomic ratio of additive metal relative to the quantity of heavy metals present in the feed at a concentration of about 5 to 10 Nickel Equivalents is also usually sufficient to provide a chlorine level of at least about 100 ppm in the flue gases.

If the chlorine component of a metal/chlorine additive is to be used for heat control, it should be introduced directly into the regenerator or into the regenerated catalyst standpipe or some other component discharging gases to the regenerator. If it is introduced instead to the riser or to the coked catalyst separator vessel or stripper, muc, if not all, of the chlorine will pass out of the conversion system with the gaseous conversion products and will not appear in the regenerator. If the additive metal/chlorine addition rate is insufficient for regenerator heat control because of low heavy metals levels in the feed, the addition rate to the regenerator may be increased as necessary to maintain the desired chlorine level in the flue gases. On the other hand, if the heavy metals level in the feed is so high that too much chlorine would be produced in the regenerator by introducing all of the additive there, a portion of the additive compound may not contain chlorine and/or may be introduced to the riser instead of the regenerator.

As an alternative to introducing the additive directly into the conversion system, a side or "slip" stream of heavy metals containing catalyst may be taken from the regenerator, cooled to near ambient conditions, and treated with a solution containing an organic or inorganic compound of one or more of the specified metals. This method of ambient treatment is advantageous where the treating solution is an ion exchange solution or contains an ingredient which may be detrimental to either the catalyst or the conversion process since the treating solution is separated from the catalyst before the latter is returned to the conversion system. Various flow arrangements may be utilized to isolate a batch of slip stream catalyst so that it may be cooled and treated with such solutions. For example, the slip stream may be drawn off from one or more stages of a multiple stage regenerator and returned to the same or a different stage or to the regenerated catalyst standpipe.

It is also within the scope of the invention to employ a continuous slip stream system for continuously drawing off, treating and returning a moving slip stream of hot catalyst where the treating solution does not have to be separated from the returned catalyst. Regardless of whether the bulk of the treating solution is to be separated from returned catalyst, it is contemplated that the treated catalyst may be returned to the conversion system in either a wet, partially dry or completely dry state.

Although passivating treatment may be commenced after the catalyst has reached equilibrium, it is preferable to intimately mix the additive metal compounds of the invention with the oil feed and to introduce this mixture into the riser from the beginning of operations with fresh catalyst so that the additive metal is intimately mixed with the deposits of heavy metals at the time the catalyst reaches equilibrium. By maintaining the desired atomic ratio of additive metal to heavy metals in the feed, the additive metal and the heavy metals are deposited on the catalyst together at the desired atomic ratio and each will therefore accumulate to an equilibrium level corresponding to the rate of catalyst replacement. In this way, sufficient additive metal will always be present on the catalyst regardless of the level of heavy metals at which the catalyst is allowed to equilibrate.

If the heavy metals on the catalyst have already reached their equilibrium level before treatment is initiated, the amount of additive metal to be introduced is based on the then existing heavy metals inventory on the catalyst inventory. The rate of addition of the additive metal compound is then chosen so as to effectively coat the existing heavy metal deposits within a reasonable period of time. A preferred rate of addition is in the range of about 1 to 20 percent per hour, preferably about 5 to 10 percent per hour, of the total quantity of additive metal needed to achieve a 1:1 atomic ratio of final additive metal inventory to total heavy metals inventory on catalyst. After the final desired atomic ratio is attained on the catalyst, whether it be 1:1, 2:1 or higher (the total time of addition merely being extended at the same addition rate for atomic ratios greater than 1.0), the rate of addition of the additive metal compound is then reduced to that required to passivate the additional heavy metals still being introduced with fresh feed. While the quantity of additive needed to passivate heavy metals in the feed is preferably introduced with the feed, the quantity of additive for heavy metals accumulating prior to initiation of treatment may be added effectively at points of addition in the conversion system other than the riser, such as the regenerator or regenerated catalyst standpipe. In the regard, a portion of the additive may always be comprised of a chlorine containing metal compound added to the regenerator or related components to take advantage of the chlorine thereby introduced into the flue gases.

Spinel coatings, as compared to oxide coatings alone, are believed to be more effective in passivating the adverse effects of heavy metals. The formation of spinels is favored by high catalyst temperatures of at least 1200° F., preferably 1300° F. or higher, more preferably in the range of about 1300° F. to about 1500° F., and most preferably in the range of about 1325° F. to about 1400° F. The regeneration gas may be air which contains about 21 percent oxygen or enriched air containing oxygen concentrations in the range of 21 to 46 weight percent, which is equivalent to adding from 0 to 25 weight percent oxygen to enrich ordinary air.

Figure 2:
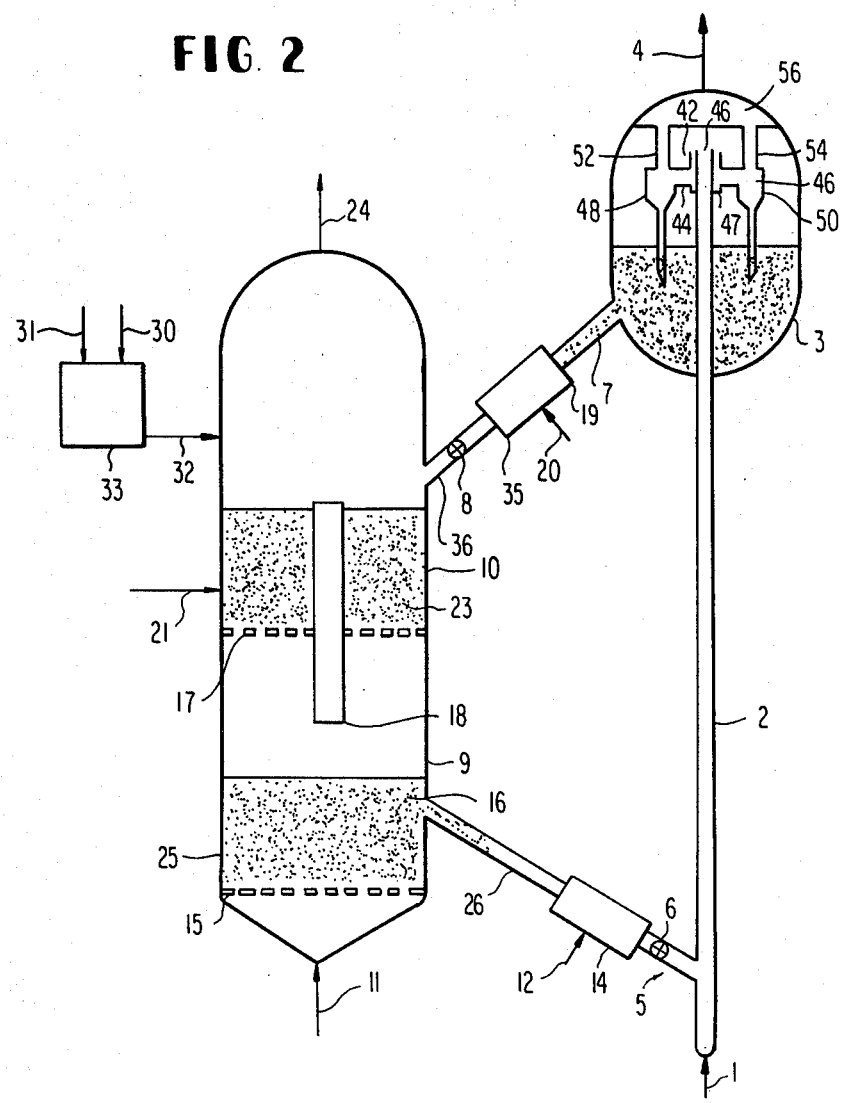
FIG. 2 is a schematic diagram of an apparatus for carrying out the process of the invention.
Figure 3:
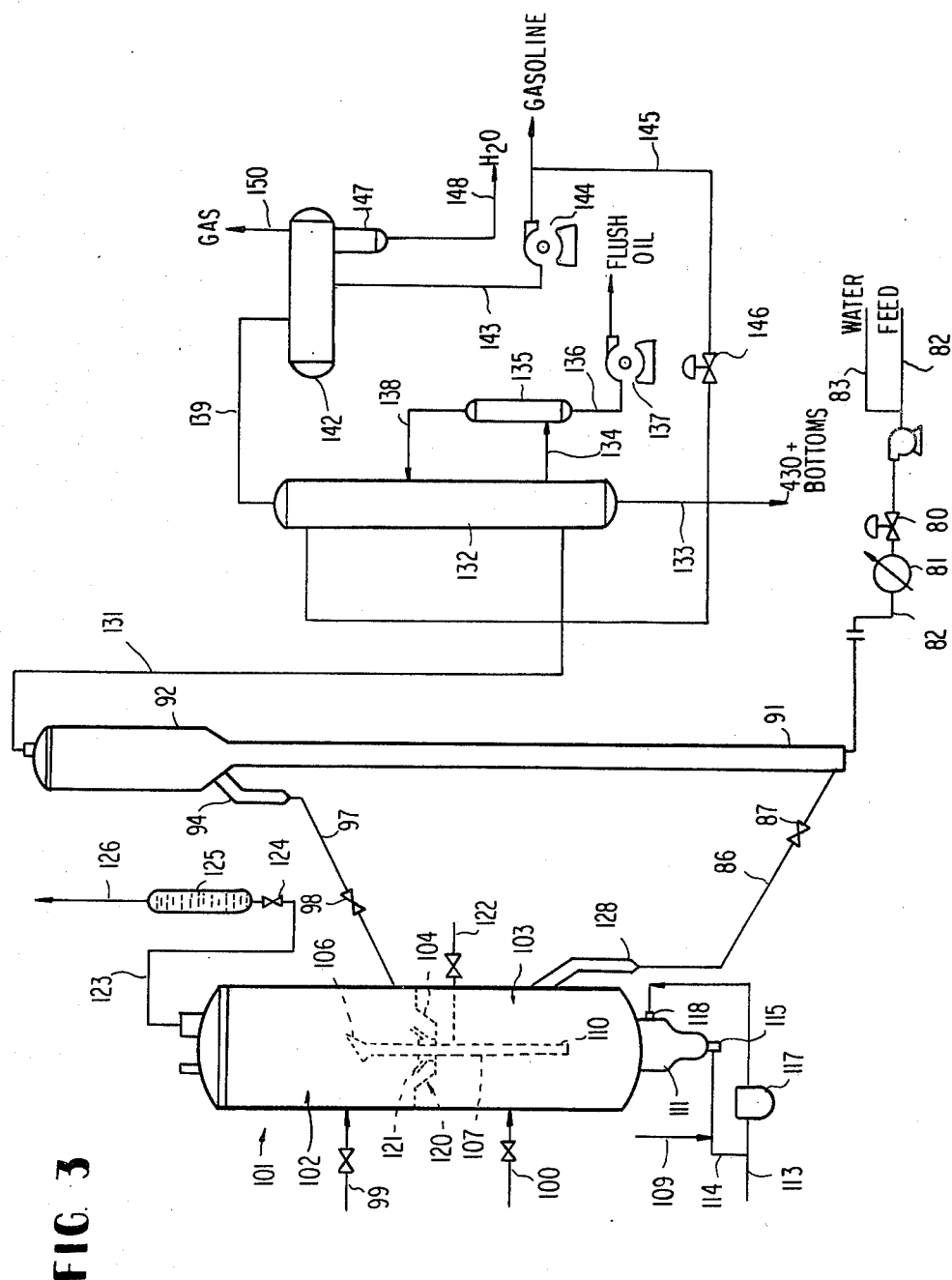
FIG. 3 is a schematic diagram of another apparatus for carrying out the process of the invention.

Since zeolite in the catalyst may be damaged by excessive temperatures and/or excessive residence times at high temperatures, it is preferable to control catalyst residence times at temperatures greater than 1300° F. to less than 10 minutes, preferably less than 5 minutes, and more preferably less than 3 minutes. For this purpose, it is preferable to use a regenerator having two or more stages or zones, with at least one of those stages or zones being operated at the high temperatures favoring spinel formation and with the relatively short catalyst residence time specified. Division of the regenerator into upper and lower regeneration chambers as shown in FIGS. 2 and 3 of the drawings is of unique assistance in controlling regeneration and catalyst parameters so that both spinel formation and low levels of coke are favored on regenerated catalyst being returned to the riser for contact with fresh feed.

Sufficient additive metal compound is deposited on the catalyst to reduce the gas make by at least about 10 weight percent, more preferably by at least about 20 weight percent, and most preferably by about 30 to about 50 weight percent. The corresponding reduction in the amount of coke resulting from reactions catalyzed by heavy metal deposits is preferably at least 5 weight percent, more preferably at least 10 weight percent, and most preferably within the range of 10 to 20 weight percent. However, it should be recognized that the amount of total coke produced may increase during the period that fresh catalyst is achieving equilibrium, even with the additive metal present in admixture with the heavy metals. This is because there may be catalytically active sites in the matrix which favor low coke production and these sites may be covered up by the deposited materials so that the matrix loses some of its favorable activity and net coke production increases. Nevertheless, that proportion of the coke produced by adverse catalytic activity of the heavy metals is reduced by the passivating treatment of the invention. Net reductions in total coke are more likely to be observed where the catalyst has a relatively inert matrix and comparisons are made at equilibrium conditions with and without additive metal.

Coating of the heavy metals provides a reduction in the level of non-selective conversion caused by these contaminates. With less non-selective conversion, there is a corresponding decrease in gas make and a corresponding increase in gasoline selectivity. The quantity of additive metal compound used is sufficient to increase the gasoline yield by an amount in the range of 1 to 10 volume percent. Where additive metal treatment is initiated with fresh catalyst having no heavy metals or a very low level of heavy metals, an increase in conversion in the range of 1 to 5 volume percent may also be realized. Increased conversion is believed to result from the oxide and/or spinel coating tying up at least a portion of the nickel and/or vanadium so that these metals cause less destruction of the zeolite in the catalyst. Such protection of the zeolite results in a corresponding increase in the level of conversion at equilibrium conditions.

However, there may be no such increase in conversion and even a decrease in conversion may be experienced where treatment of the catalyst is not initiated until after an equilibrium loading of heavy metals on the catalyst has been attained. In this latter case, the nickel and vanadium probably have already reached the zeolite so that its destruction continues to progress after introduction of the additive onto the matrix. Thus, reduction in selective conversion by the zeolite, together with reduction in non-selective conversion by the coated heavy metals, may result in an overall decrease in the conversion level of the process.

A preferred additive metal is aluminum because its salts readily decompose to form an inert oxide layer which is believed to contain an aluminate spinel at the oxide layer to heavy metals interface. Preferred aluminum salts include aluminum sulfate, aluminum chloride, aluminum nitrate, and aluminum chloride hexahydrate. Because it is inexpensive and highly water soluble, aluminum sulfate (alum) is a preferred additive to the riser where it can be introduced along with liquid water mixed with the feed. A relatively inexpensive and preferred additive to the regenerator is aluminum chloride hexahydrate which is also useful for its chlorine content as previously explained. These aluminum compounds are preferably added at weight ratios relative to heavy metals in the feed and/or on the catalyst of at least 1.0, preferably in the range of 1.5 to 4.0, and more preferably in the range of 1.5 to 2.0.

The aluminum salt may be inorganic or organic; it may be added as a solid in powder form; it may be dissolved in a liquid, either aqueous or organic; or it may be suspended in a liquid, either aqueous or organic.

The point at which the aluminum salt is introduced determines to some extent its preferred state. If the aluminum salt is to be added with fresh catalyst, the same solids handling system can be used to introduce this additive as is used to add fresh catalyst. An aluminum salt added with the catalyst is therefore preferably a solid in the form of a finely-divided powder. The particle size is not critical and may suitably range from 10 to 500 microns, and is preferably in the size range of 20 to 140 microns, since particles smaller than about 20 microns tend to blow out of a fluidized bed with catalyst fines, and particles larger than about 140 microns do not fluidize as well as smaller particles.

If the aluminum salt is added, suspended or dissolved in a liquid, the addition can be made at any accessible point in the system, either in the regenerator or reactor or in lines passing between the reactor and regenerator. The addition of this salt to the riser where the aluminum component can be deposited on the catalyst in intimate admixture with the heavy metal deposits is preferred.

The present invention is notable in providing a simple, relatively straightforward and highly productive approach to the conversion of carbo-metallic feed, such as reduced crude or the like, to various lighter products such as gasoline. The carbo-metallic feed comprises or is composed of oil which boils above about 650° F. Such oil, or at least the 650° F.+ portion thereof, is characterized by a heavy metal content of at least about 4, preferably more than about 5, and most preferably at least about 5.5 ppm of Nickel Equivalents by weight and by a carbon residue on pyrolysis of at least about 1% and more preferably at least about 2% by weight. In accordance with the invention, the carbo-metallic feed, in the form of a pumpable liquid, is brought into contact with hot conversion catalyst in a weight ratio of catalyst to feed in the range of about 3 to about 18 and preferably more than about 6.

The feed in said mixture undergoes a conversion step which includes cracking while the mixture of feed and catalyst is flowing through a progressive flow type reactor. The reactor includes an elongated reaction chamber which is at least partly vertical or inclined and in which the feed material, resultant products and catalyst are maintained in contact with one another while flowing as a dilute phase or stream for a predetermined riser residence time in the range of about 0.5 to about 10 seconds. The feed, catalyst, and other materials may be introduced into the reaction chamber at one or more points along its length.

The reaction is conducted at a temperature of about 900° to about 1400° F., measured at the reaction chamber exit, under a total pressure of about 10 to about 50 psia (pounds per square inch absolute) under conditions sufficiently severe to provide a conversion per pass in the range of about 50% or more and to lay down coke on the catalyst in an amount in the range of about 0.3 to about 3% by weight of catalyst and preferably at least about 0.5%. The overall rate of coke production, based on weight of fresh feed, is in the range of about 4 to about 14% by weight.

At the end of the predetermined residence time, the catalyst is separated from the products, is stripped to remove high boiling components and other entrained or adsorbed hydrocarbons and is then regenerated with oxygen-containing combustion-supporting gas under conditions of time, temperature and atmosphere sufficient to reduce the carbon on the regenerated catalyst to about 0.25% or less and preferably about 0.05% or less by weight.

Depending on how the process of the invention is practiced, one or more of the following additional advantages may be realized. If desired, and preferably, the process may be operated without added hydrogen in the reaction chamber. If desired, and preferably, the process may be operated without prior hydrotreating of the feed and/or without other process of removal of asphaltenes of metals from the feed, and this is true even where the carbo-metallic oil as a whole contains more than about 4, or more than about 5 or even more than about 5.5 ppm Nickel Equivalents by weight of heavy metal and has a carbon residue on pyrolysis greater than about 1%, greater than about 1.4% or greater than about 2% by weight. Moreover, all of the converter feed, as above described, may be cracked in one and the same conversion chamber. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

According to one preferred embodiment or aspect of the invention, at the end of the predetermined residence time referred to above, the catalyst is projected in a direction established by the elongated reaction chamber or an extension thereof, while the products, having lesser momentum, are caused to make an abrupt change of direction, resulting in an abrupt, substantially instantaneous ballistic separate of products from catalyst. The thus separated catalyst is then stripped, regenerated and recycled to the reactor as above described.

According to another preferred embodiment or aspect of the invention, the converter feed contains 650° F.+ material which has not been hydrotreated and is characterized in part by containing at least about 5.5 parts per million of nickel equivalents of heavy metals. The converter feed is brought together not only with the above mentioned cracking catalyst, but also with additional gaseous material including steam whereby the resultant suspension of catalyst and feed also includes gaseous material wherein the ratio of the partial pressure of the added gaseous material relative to that of the feed is in the range of about 0.25 to about 4.0. The vapor residence time is in the range of about 0.5 to about 3 seconds when practicing this embodiment or aspect of the invention. This preferred embodiment or aspect and the one referred to in the preceding paragraph may be used in combination with one another or separately.

According to another preferred embodiment or aspect of the invention, the carbo-metallic feed is not only brought into contact with the catalyst, but also with one or more additional materials including particularly liquid water in a weight ratio relative to feed ranging from about 0.04 to about 0.25, more preferably about 0.04 to about 0.2 and still more preferably about 0.05 to about 0.15. Such additional materials, including the liquid water, may be brought into admixture with the feed prior to, during or after mixing the feed with the aforementioned catalyst, and either after or, preferably, before, vaporization of the feed. The feed, catalyst and water (e.g. in the form of liquid water or in the form of steam produced by vaporization of liquid water in contact with the feed) are introduced into the progressive flow type reactor, which may or may not be a reactor embodying the above described ballistic separation, at one or more points along the reactor. While the mixture of feed, catalyst and steam produced by vaporization of the liquid water flows through the reactor, the feed undergoes the above mentioned conversion step which includes cracking. The feed material, catalyst, steam and resultant products are maintained in contact with one another in the above mentioned elongated reaction chamber while flowing as a dilute phase or stream for the above mentioned predetermined riser residence time which is in the range of about 0.5 to about 10 seconds, preferably about 0.5 to about 2 seconds.

The present invention provides a process for the continuous catalytic conversion of a wide variety of carbometallic oils to lower molecular weight products, while maximizing production of highly valuable liquid products, and making it possible, if desired, to avoid vacuum distillation and other expensive treatments such as hydrotreating. The term "oils", includes not only those predominantly hydrocarbon compositions which are liquid at room temperature (i.e., 68° F.), but also those predominantly hydrocarbon compositions which are asphalts or tars at ambient temperature but liquify when heated to temperatures in the range of up to about 800° F.

The invention is applicable to carbo-metallic oils, whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. Persons skilled in the art are aware of techniques for demetalation of carbometallic oils, and demetalated oils may be converted using the invention; but it is an advantage of the invention that it can employ as feedstock carbo-metallic oils that have had no prior demetalation treatment. Likewise, the invention can be applied to hydrotreated feedstocks; but it is an advantage of the invention that it can successfully convert carbo-metallic oils which have had substantially no prior hydrotreatment. However, the preferred application of the process is to reduce crude, i.e., that fraction of crude oil boiling at and above 650° F., along or in admixture with virgin gas oils. While the use of material that has been subjected to prior vacuum distillation is not excluded, it is an advantage of the invention that it can satisfactorily process material which has had no prior vacuum distillation, thus saving on capital investment and operating costs as compared to conventional FCC processes that require a vacuum distillation unit.

In accordance with the invention one provides a carbo-metallic oil feedstock, at least about 70%, more preferably at least about 85% and still more preferably about 100% (by volume) of which boils at and above about 650° F. All boiling temperatures herein are based on standard atmospheric pressure conditions. In carbo-metallic oil partly or wholly composed of material which boils at and above about 650° F., such material is referred to herein as 650° F.+ material; and 650° F.+ material which is part of or has been separated from an oil containing component boiling above and below 650° F. may be referred to as a 650° F.+ fraction. But the terms "boils above" and "650° F.+" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials when present, may frequently or for the most part be concentrated in portions of the feed which do not boil below about 1000° F., 1025° F. or higher. Thus, when it is said that at least about 10%, more preferably about 15%, and still more preferably at least about 20% (by volume) of the 650° F.+ fraction will not boil below about 1000° F. or 1025° F., it should be understood that all or any part of the material not boiling below about 1000° F. or 1025° F., may or may not be volatile at and above the indicated temperatures.

Preferably, the contemplated feeds, or at least the 650° F.+ material therein, have a carbon residue on pyrolysis of at least about 2 or greater. For example, the Conradson carbon content may be in the range of about 2 to about 12 and most frequently at least about 4. A particularly common range is about 4 to about 8. Those feeds having aConradson carbon content greater than about 6 may need special means for controlling excess heat in the regenerator.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al., entitled "Deposited Metals Poison FCC Catalyst", *Oil and Gas Journal*, May 15, 1972, pp 112–122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al., the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 5 weight percent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tend to reduce its susceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650°F.+ fraction.

The carbo-metallic oils useful in the invention may and usually do contain significant quantities of heavy, high boiling compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam whih are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a) an atomic hydrogen to carbon ratio in the range of about 1.3 to about 1.8; (b) a Conradson carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at last about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully produce large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 10 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant through-put and the total number of tons of catalyst undergoing circulation throughout all phases of the process can vary widely. For purposes of this disclosure, daily plant through-put is defined as the number of barrels of fresh feed boiling above about 650° F. which that plant processes per average day of operation to liquid products boiling below about 430° F. For example, in one commercially successful type of FCC-VGO operation, about 8 to about 12 tons of catalyst are under circulation in the process per 1000 barrels per day of plant through-put. In another commercially successful process, this ratio is in the range of about 2 to 3. While the present invention may be practiced in the range of about 2 to about 30 and more typically about 2 to about 12 tons of catalyst inventory per 1000 barrels of daily plant through-put, it is preferred to carry out the process of the present invention with a very small ratio of catalyst weight to daily plant through-put. More specifically, it is preferred to carry out the process of the present invention with an inventory of catalyst that is sufficient to contact the feed for the desired residence time in the above indicated catalyst to oil ratio while minimizing the amount of catalyst inventory, relative to plant through-put, which is undergoing circulation or being held for treatment in other phases of the process such as, for example, stripping, regeneration and the like. Thus, more particularly, it is preferred to carry out the process of the present invention with about 2 to about 5 and more preferably about 2 tons of catalyst inventory or less per thousand barrels of daily plant through-put.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 pounds per barrel of feed. If on the other hand equilibrium catalyst from FCC operation is to be utilized, replacement rates as high as about 5 pounds per barrel can be practiced.

Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed. However, operation at a higher level such as 10,000 ppm Ni+V on catalyst would enable one to substantially reduce the replacement rate, such as for example to about 1.3 pounds of catalyst per barrel of feed. Thus, the levels of metal(s) on the catalyst and catalyst replacement rates may in general be respectively increased and decreased to any value consistent with the catalyst activity which is available and desired for conducting the process.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures of carbo-metallic feedstocks and regeneration conditions. Thus, the process appears to afford significant control over the poisoning effect of heavy metals on the catalyst even when the accumulations of such metals are quite substantial.

Accordingly, the process may be practiced with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 50,000 ppm or higher. More specifically, the accumulation may be in the range of about 3,000 to about 30,000 ppm, preferably in the range of 3,000 to 20,000 ppm, and more preferably about 3,000 to about 12,000 ppm. Within these ranges just mentioned, operation at metals levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

The invention described in this specification may be employed in the processes and apparatuses for carbo-metallic oil conversion described in co-pending U.S. Application Ser. Nos. 94,091 now U.S. Pat. No. 4,299,687, 94,092 now U.S. Pat. No. 4,332,673, 94,216 now U.S. Pat. No. 4,341,624, 94,217 now U.S. Pat. No. 4,347,122 and 94,227 now U.S. Pat. No. 4,354,923, all filed Nov. 14, 1979; and Ser. Nos. 246,751, 246,782 and 246,791, all filed Mar. 23, 1981; said applications being in the name of George D. Myers alone or jointly with Lloyd E. Busch and assigned or to be assigned to Ashland Oil, Inc., and the entire disclosure of each of said applications being incorporated herein by reference. While the processes described in these applications can handle reduced crudes or crude oils containing high metals and Conradson carbon values not susceptible previously to direct processing, certain crudes such as Mexican Mayan or Venezuelan and certain other types of oil feeds contain abnormally high heavy metals and Conradson carbon values. If these very poor grades of oil are processed in a carbo-metallic process, they may lead to uneconomical operations because of high heat loads on the regnerator and/or high catalyst addition rates to maintain adequate catalyst activity and/or selectivity. In order to improve the grade of very poor grades of oil, such as those containing more than 50 ppm heavy metals and/or more than 8 weight percent Conradson carbon and preferably more than 100 ppm heavy metals and/or more than 10 weight percent Conradson carbon, these oils may be pretreated with a sorbent to reduce the levels of these contaminants to the aforementioned or lower values. Such upgrading processes are described in U.S. Pat. No. 4,263,128 of Apr. 21, 1981, in the name of David B. Bartholic, and in International Patent Application No. PCT/US81/00357 filed in the U.S. Receiving Office on Mar. 19, 1981, in the names of Ashland Oil, Inc., et al., and entitled "Immmobilization of Vanadia Deposited on Sorbent Materials During Treatment of Carbo-Metallic Oils", the entire disclosures of said patent and said application being incorporated herein by reference.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 430° F. end point gasoline, lighter products and coke at 900° F., 16 WHSV (weight hourly space velocity, calculated on a moisture free basis, using clean catalyst which has been dried at 1100° F., weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweet light primary gas oil, such as that used by Davison, Division of W. R. Grace, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt. % | 0.04 |
| Carbon, wt. % | 84.92 |
| Hydrogen, wt. % | 12.94 |

-continued

| | |
|---|---|
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation | ASTM D-1160 |
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the produce produced in the MAT conversion test may for example be determined by simulated distillation techniques, for example modifications of gas chromate graphic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935–937 of Hougen and Watson, *Chemical Process Principles*, John Wiley & Sons, Inc., N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalysts useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. end point gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expect that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst.

Relative activity at a constant level of conversion is also equal to the ratio of the Weight Hourly Space Velocity (WHSV) of an operational or "test" catalyst divided by the WHSV of a standard catalyst selected for its level of conversion at MAT conditions. To simplify the calculation of relative activity for different test catalysts against the same standard catalyst, a MAT conversion versus relative activity curve may be developed. One such curve utilizing a standard catalyst of 75 volume percent conversion to represent 100 percent relative activity is shown in FIG. 1.

The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g., smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair with the suitability of the catalyst, provided the resultant catalyst has the activity and pore structure referred to above. For example, if the virgin catalyst is a mixture, it may include the zeolite component associated with or dispersed in a porous refractory inorganic oxide carrier, in such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work On Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electronegative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. No. 2,882,244; Zeolite Y, U.S. Pat. No. 3,130,007; and Zeolite A, U.S. Pat. No. 2,882,243; as well as Zeolite B, U.S. Pat. No. 3,008,803; Zeolite D, Canada Pat. No. 661,981; Zeolite E, Canada Pat. No. 614,495; Zeolite F, U.S. Pat. No. 2,996,358; Zeolite H, U.S. Pat. No. 3,010,789; Zeolite J. U.S. Pat. No. 3,011,869; Zeolite L, Belgian Pat. No. 575,177; Zeolite M, U.S. Pat. No. 2,995,423; Zeolite O, U.S. Pat. No. 3,140,252; Zeolite Q, U.S. Pat. No. 2,991,151; Zeolite S, U.S. Pat. No. 3,054,657; Zeolite T, U.S. Pat. No. 2,950,952; Zeolite W, U.S. Pat. No. 3,012,853; Zeolite Z, Canada Pat. No. 614,495; and Zeolite Omega, Canada Pat. No. 817,915. Also, ZK-4HJ, alpha beta and ZSM-type zeolites are useful. Moreover, the zeolites described in U.S. Pat. Nos. 3,140,249; 3,140,253; 3,944,482; and 4,137,151 are also useful, the disclosures of said patents being incoporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, the latter being defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, include for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance, described in U.S. Pat. No. 3,944,482, in which the catalyst contains 1–40 weight percent of a rare earth-exchanged zeolite, the balance being a refractory metal oxide having specified pore volume and size distribution. Other catalysts described as "metals-tolerant" are described in the above mentioned Cimbala, et al., article.

In general, it is preferred to employ catalysts having an overall particle size in the range of about 5 to about 160, more preferably about 40 to about 120, and most preferably about 40 to about 80 microns. For example, a useful catalyst may have a skeletal density of about 150 pounds per cubic foot and an average particle size of about 60–70 microns, with less than 10% of the particles having a size less than about 40 microns and less than 80% having a size less than about 50–60 microns.

Although a wide variety of other catalysts, including both zeolite-containing and non-zeolite-containing may be employed in the practice of the invention the following are examples of commercially available catalysts which may be employed in practicing the invention:

TABLE 2

| | Specific Surface m²/g | Weight Percent | | | | | |
|---|---|---|---|---|---|---|---|
| | | Zeolite Content | Al₂O₃ | SiO₂ | Na₂O | Fe₂O | TiO₂ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 1750° F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst".

Among the above mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metals-tolerant.

Although not yet commercially available, it is believed that the best catalysts for carrying out the present invention are those which are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus significant numbers of liquid hydrocarbon molecules can diffuse to active catalytic sites both in the matrix and in sieve particles on the surface of the matrix. In general it is preferred to employ catalysts having a total pore volume greater than 0.2 cc/gm, preferably at least 0.4 cc/gm, more preferably at least 0.6 cc/gm and most preferably in the range of 0.7 to 1.0 cc/gm, and with matrices wherein at least 0.1 cc/gm, and preferably at least 0.2 cc/gm, of said total pore volume is comprised of feeder pores having diameters in the range of about 400 to about 6000 angstrom units, more preferably in the range of about 1000 to about 6000 angstrom units. These catalysts and the method for making the same are described more fully in copending international application Ser. No. PCT/US81/00492 filed in the U.S. Receiving Office on Apr. 10, 1981, in the names of Ashland Oil, Inc., et al., and entitled "Large Pore Catalysts for Heavy Hydrocarbon Conversion", the entire disclosure of said application being incorporated herein by reference.

Catalysts for carrying out the present invention may also employ other metal additives for controlling the adverse effects of vanadium as described in PCT International Application Ser. No. PCT/US81/00356 filed in the U.S. Receiving Office on Mar. 19, 1981, in the names of Ashland Oil, Inc., et al., and entitled "Immobilization of Vanadia Deposited on Catalytic Materials During Carbo-Metallic Oil Conversion". The manner in which these other metal additives are believed to interact with vanadium is set forth in said PCT international application, the entire disclosure of which is incorporated herein by reference. Certain of the additive metal compounds disclosed in this referenced PCT application, particularly those of titanium and zirconium, will also passivate nickel, iron and copper. The passivating mechanism of titanium and zirconium on nickel, iron and copper is believed to be similar to that of aluminum and silicon, namely, an oxide and/or spinel coating may be formed. Where the additive is introduced directly into the conversion process, that is into the riser, into the regenerator or into any intermediate components, the additive is preferably an organo-metallic compound of titanium or zirconium soluble in the hydrocarbon feed or in a hydrocarbon solvent miscible with the feed. Examples of preferred organo-metallic compounds of these metals are tetraisopropyltitanate, TI $(C_3H_7O)_4$, available as TYZOR from the Du Pont Company; zirconium isopropoxide, $Zr(C_3H_7O)_4$; and zirconium 2,4-pentanedionate—$Zr(C_5H_7O_2)_4$. These organo-metallics are only a partial example of the various types available and others would include alcoholates, esters, phenolates, naphthenates, carboxylates, dienyl sandwich compounds, and the like. Other preferred process additives include titanium tetrachloride, zirconium tetrachloride and zirconium acetate, and the water soluble inorganic salts of these metals, including the sulfates, nitrates and chlorides, which are relatively inexpensive.

Because the atomic weight of zirconium differs relative to the atomic weights of nickel and vanadium, while that of titanium is about the same, a 1:1 atomic ratio is equivalent to about a 1.0 weight ratio of titanium to nickel plus vanadium, and to about a 2.0 weight ratio of zirconium to nickel plus vanadium. Multiples of the 1:1 atomic ratio require the same multiple of the weight ratio. For example a 2:1 atomic ratio requires about a 2.0 titanium weight ratio and about a 4.0 zirconium weight ratio.

A particularly preferred catalyst also include vanadium traps as disclosed in U.S. patent application Ser. No. 252,967 pending filed Apr. 10, 1981, in the names of William P. Hettinger, Jr., et al., and entitled "Trapping of Metals Deposited on Catalytic Materials During Carbo-Metallic Oil Conversion". It is also preferred to control the valence state of vanadium accumulations on the catalyst during regeneration as disclosed in the U.S. patent application entitled "Immobilization of Vanadium Deposited on Catalytic Materials During Carbo-Metallic Oil Conversion" filed in the names of William P. Hettinger, Jr., et al., on Apr. 20, 1981, as well as the continuation-in-part of the same application subsequently filed on Apr. 28, 1981. The entire disclosures of said U.S. patent applications are incorporated herein by reference.

It is considered an advantage that the process of the present invention can be conducted in the substantial absence of tin and/or antimony or at least in the presence of a catalyst which is substantially free of either or both of these metals.

The process of the present invention may be operated with the above described carbo-metallic oil and catalyst as substantially the sole materials charged to the reaction zone, although it is preferable to also charge the aluminum additive to this zone as previously described. The charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock for example as disclosed in copending application Ser. No. 246,791, entitled "Use of Naphtha in Carbo-Metallic Oil Conversion", filed in the name of George D. Myers on Mar. 23, 1981 (now U.S. Pat. No. 4,376,038), which application is incorporated herein by reference; assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tend to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. The water used for these purposes may or may not contain the aluminum additive of the invention. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone.

Preferably the weight ratio of liquid water to feed is about 0.04 to about 0.2 more preferably about 0.05 to about 0.15.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as a heavy naphtha or relatively low molecular weight carbon-hydrocarbon fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawal of products and one or more points for withdrawal of catalyst.

The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 abandoned of George D. Myers, et al., filed Dec. 14, 1978, the entire disclosure of which is hereby incorporated herein by reference. Accordingly to a particularly preferred embodiment based on a suggestion which is understood to have emanated from Mr. Stephen M. Kovach, the liquid water and carbo-metallic oil, prior to their introduction into the riser, are caused to pass through a propeller, apertured disc, or any appropriate high shear agitating means for forming a "homogenized mixture" containing finely divided droplets of oil and/or water with oil and/or water present as a continuous phase.

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabilities of the reactor will in general be sufficient to prevent substantial build-up of catalyst bed in the bottom or other portions of the riser, whereby the catalyst loading in the riser can be maintained below about 4 or 5 pounds, as for example about 0.5 pounds, and below about 2 pounds, as for example 0.8 pounds, per cubic foot, respectively, at the upstream (e.g., bottom) and downstream (e.g., top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of the catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port in the side of the tube adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. Examples of a ballistic separation apparatus and techniques as above described, are found in U.S. Pat. Nos. 4,066,533 and 4,070,159 to Myers, et al., the disclosures of which patents are hereby incorporated herein by reference in their entireties.

The mode of catalyst/product separation presently deemed best for practicing the present invention is disclosed in a U.S. patent application Ser. No. 06/263394, filed simultaneously herewith in the names of Paul W. Walters, Roger M. Benslay, and Dwight F. Barger, entitled CARBO-METALLIC OIL CONVERSION WITH BALLISTIC SEPARATION. The ballistic separation step includes at least a partial reversal of direction by the product vapors upon discharge from the riser tube; that is, the product vapors make a turn or change of direction which exceeds 90° at the riser tube outlet. This may be accomplished for example by providing an annular cup-like member surrounding the riser tube at its upper end, the ratio of cross-sectional area of the annulus of the cup-like member relative to the cross-sectional area of the riser tube outlet being low i.e., less than 1 and preferably less than about 0.6. Preferably the lip of the cup is slightly downstream of, or above the downstream end or top of the riser tube, and the cup is preferably concentric with the riser tube. By means of a product vapor line communicating with the interior of the cup but not the interior of the riser tube, having its inlet positioned within the cup interior in a direction upstream of the riser tube outlet, product vapors emanating from the riser tube and entering the cup by reversal of direction are transported away from the cup to auxiliary catalyst and product separation equipment downstream of the cup. Such an arrangement can produce a high degree of completion of the separation of catalyst from product vapors at the vented riser tube outlet, so that the required amount of auxiliary catalyst separation equipment such as cyclones is greatly reduced, with consequent large savings in capital investment and operating cost.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock.

Thus, where the nature of the feedstock permits, it may be fed at ambient temperature. Heavier stocks may be fed at preheat temperatures of up to about 600° F., typically about 200° F. to about 500° F., but higher preheat temperatures are not necessarily excluded.

The catalyst fed to the reactor may vary widely in temperature, for exmple from about 1100° to about 1600° F., more preferably about 1200° to about 1500° F. and most preferably about 1300° to about 1400° F., with about 1325° to about 1375° F. being considered optimum at present.

As indicated previously, the conversion of the carbometallic oil to lower molecular weight products may be conducted at a temperature of about 900° to about 1400° F., measured at the reaction chamber outlet. The reaction temperature as measured at said outlet is more preferably maintained in the range of about 965° to about 1300° F., still more preferably about 975° to about 1200° F., and most preferably about 980° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of $H_2O$ to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7.

Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about 2 seconds or less, with the aforesaid ratio being in the range of about 1 to about 2. The combination of low feed partial pressure, very low residence time and ballistic separation of products from catalyst are considered especially beneficial for the conversion of carbometallic oils. Additional benefits may be obtained in the foregoing combination when there is a substantial partial pressure of added gaseous material, especially $H_2O$ as described above.

Depending upon whether there is slippage between the catalyst and hydrocarbon vapors in the riser, the catalyst riser residence time may or may not be the same as that of the vapors. Thus, the ratio of average catalyst reactor residence time versus vapor reactor residence time, i.e., slippage, may be in the range of about 1 to about 5, more preferably about 1 to about 4 and most preferably about 1 to about 3, with about 1 to about 2 currently being considered optimum.

In practice, there will usually be a small amount of slippage, e.g., at least about 1.05 or 1.2. In an operating unit there may for example be a slippage of about 1.1 at the bottom of the riser and about 1.05 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g., upper) extremity of the riser, such as is taught in the above mentioned Myers, et al., patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminshed selectivity.

In general, the combination of catalyst to oil ratio, temperatures, pressures and residence times should be such as to effect a substantial conversion of the carbometallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 430° F. (tbp, standard atmospheric pressure).

These substantial levels of conversion may and usually do result in relatively large yields of coke, such as for example about 4 to about 14% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbometallic oil having constituents which do not volatilize under the conditions prevailing in the reactor, which constituents deposit themselves at least in part on the catalyst. Such adsorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g., with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 350° F. using steam at a pressure of about 150 psig and a weight ratio of steam to catalyst of about 0.002 to about 0.003. On the other hand, the stripper may be operated at a temperature of about 1025° F. or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and nonzeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° F. to about 1375° F. The process has been operated, for example, with a fluidized regenerator with the temperature of the catalyst dense phase in the range of about 1300° to about 1400° F.

Regeneration is preferably conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combustion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds is substantial, ranging for example from about 5 to about 30, more preferably about 5 to about 20 and still more preferably about 5 to about 10 minutes. From the foregoing, it may be readily seen that the fluidized bed regeneration of the present invention is readily distinguishable from the short-contact, low-density entrainment type regeneration which has been practiced in some FCC operations.

When regenerating catalyst to very low levels of carbon on regenerated catalyst, e.g., about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen to water, all of the carbon to carbon dioxide and all of the other combustible components, if any, which are present in the above-mentioned selected portion of the coke immediately prior to regeneration, to their highest stable state of oxidation under the regenerator conditions. The gaseous products of combustion conducted in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable but substantial, i.e., there will be concentration of at least about 2 mole percent of free oxygen in the total regeneration flue gas recovered from the entire, completed regeneration operation. While such technique is effective in attaining the desired low levels of carbon on regenerated catalyst, is has its limitations and difficulties as will become apparent from the discussion below.

Heat released by combustion of coke in the regenerator is absorbed by the catalyst and can be readily retained thereby until the regenerated catalyst is brought into contact with fresh feed. When processing carbometallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with the catalyst and the separation of product from catalyst) for supplying the heat of reaction (e.g., for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam naphtha and other hydrogen donors, flue gases and inert gases, or by radiation and other losses.

One or a combination of techniques may be utilized in this invention for controlling or restricting the amount of regeneration heat transmitted via catalyst to fresh feed.

For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including for example, heat exchangers (e.g., steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or steam, whereby the amount of inert gas available in the regenerator for heat absorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g., about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more.

While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils, in this connection see for example U.S. Pat. No. 4,162,213 to Zrinscak, Sr., et al. In this invention, however, $CO$ production is increased while catalyst is regenerated to about 0.1% carbon or less, and preferably to about 0.05% carbon or less. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen of oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 abandoned of George D. Myers, et al., filed Dec. 14, 1978, the entire disclosure of which is hereby incorporated herein by reference. Another example may be found in U.S. Pat. No. 2,398,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e., on the order of about 0.2 mole percent or less, or as low as about 0.1 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g., about 0.1% or less) which particularly enhance catalyst activity. For example, a two-stage regeneration process may be carried out with the first stage burning about 80% of the coke at a bed temperature of about 1300° F. to produce CO and $CO_2$ in a molar ratio of $CO/CO_2$ of about 1 and the second stage burning about 20% of the coke at a bed temperature of about 1350° F. to produce substantially all $CO_2$ mixed with free oxygen. Use of the gases from the second stage as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g., temperature or atmosphere, are substantially less severe in the second zone than in the first zone (e.g., by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1500° F. with a reduced temperature of at least about 10 or 20° F. in the dense phase of the first stage as compared to the dense phase of the second stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydrothermal catalyst deactivation which may result from the use of steam.

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are interrelated and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metal management and carbon management will have a direct influence on the extent to which heat management is necessary. Moreover, some of the steps taken in support of metals management have proved very helpful in respect to carbon and heat managment.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e., the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful, these include for instance the use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g., pressure drop in downstream equipment) the above described benefits may be obtained by restricting the feed partial pressure. Suitable ranges for total reactor pressure and feed partial pressure have been set forth above, and in general it is desirable to attempt to minimize the pressure within these ranges.

The abrupt separation of catalyst from product vapors and unconverted feed (if any) is also of great assistance. It is for this reasons that the so-called vented riser apparatus and technique disclosed in U.S. Pat. Nos. 4,070,159 and 4,066,533 to George D. Myers, et al., is the preferred type of apparatus for conducting this process. For similar reasons, it is beneficial to reduce insofar as possible the elapsed time between separation of catalyst from product vapors and the commencement of stripping. The vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practic using VGO, wherein it is usually a problem to generate sufficient heat during regeneration to heat balance the reactor, the processing of carbometallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon laydown. Other techniques for absorbing heat have also been discussed above in connection with the introduction of water, steam, and other gaseous or vaporizable materials into the reactor.

As noted above, the invention can be practiced in the abovedescribed mode and in many others. An illustrative, nonlimiting example is described by the accompanying schematic diagrams in the figure and by the description of this figure which follows.

Referring in detail to the drawing, FIG. 2 petroleum feedstock is introduced into the lower end of riser reactor 2 through inlet line 1, at which point it is mixed with hot regenerated catalyst coming through line 5 and stripper 14 from regenerator 9.

The feedstock is catalytically cracked in passing up riser 2 and the product vapors are ballistically separated from catalyst particles in vessel 3. Riser 2 is of the vented type having an open upper end 40 surrounded by a cup-like member 42 which preferably extends above the upper end 40 of the riser so that the lip of the cup is slightly downstream of the open riser tube as shown in FIG. 2. A pair of product vapor lines 44, 46 communicate with the interior of the cup so as to discharge product vapors entering the cup from the vapor space of vessel 3. The cup forms an annulus 47 around and concentric to the upper end of the riser tube. The transverse cross-sectional area of annulus 47 is preferably less than, more preferably about 60% or less of, the transverse cross-sectional area of riser tube 2. This structure causes product vapors to undergo a complete reversal in their direction of flow after they are discharged from the riser tube but before they leave the vapor space of vessel 3. The product vapors then make a further turn or change in direction of about 90° as they enter product lines 44 and 46. The product vapors then enter cyclone separators 48, 50 having overhead conduits 52, 54, respectively, which convey the vapors to line 4 through a common header 56. The particle separation efficiency of this flow reversal structure is greater by a factor of about 10 or higher than the efficiency of the basic vented riser arrangement described in U.S. Pat. Nos. 4,066,533 and 4,070,159. Due to this increase in efficiency, cyclone separators 48 and 50 may comprise only a single cyclone stage instead of having multiple stages as usually required to prevent excessive carry over of catalyst fines into the overhead vapor line in prior vented riser applications.

The catalyst, contaminated with coke, is removed from separator vessel 3 and passed into stripper 19 through line 7. Stripped catalyst is introduced into bed 23 in upper zone 10 of regenerated 9 through line 36. The rate of flow of catalyst into zone 10 is controlled by valve 8.

Makeup catalyst, whether virgin or used, is introduced through lines 30 and 31 into solids feeder 33 and then through line 32. Oxidizing gas, such as air, is introduced into zone 10 through line 21. A portion of the coke on the catalyst is burned in zone 10 and the partially regenerated catalyst flows downwardly through conduit 18 into lower regeneration zone 25.

An oxidizing gas, such as air, is introduced into regeneration zone 25 through line 11. The oxidizing gas flows through gas distribution plate 15 and thus into the bed 16 or catalyst particles. This mixture passes upwardly through the bed 16 of coke-contaminated catalyst particles, fluidizing it as well as reacting with the coke, and passes through perforated plate 17 into the bed of catalyst particles in zone 10.

The perforations in the plate 17 are large enough so that the upwardly flowing gas readily passes therethrough into zone 10. During regeneration of the catalyst the pressure difference between the upper and lower zones prevents catalyst particles from passing downwardly through the plate. Gases within the regenerator comprising combustion products, nitrogen and possibly additives for combustion control, such as steam and/or chlorine, are separated from suspended catalyst particles by a separator (not shown) and then pass out of the regenerator through line 24.

Regenerated catalyst is removed from zone 25 through conduit 26 for return to riser 2 through the stripper 14, the rate of removal being controlled by valve 6.

A stripping gas such as steam is introduced into stripper 19 through line 20 to remove volatiles from the catalyst. The volatiles pass from the stripper through line 7 into vessel 3 and then out through line 4. Similarly a stripper gas, such as steam is introduced into stripper 14 through line 12 to remove absorbed nitrogen from the regenerated catalyst before it is returned to the reactor 2. The stripped gases pass through line 26 into the regenerator 9.

While this invention may be used with single stage regenerators, or with multiple stage regenerators having cocurrent instead of countercurrent flow, it is especially useful in a regenerator of the type shown which is well-suited for producing gases having a high ratio of CO to $CO_2$.

In a preferred method of carrying out this invention in a countercurrent flow pattern, as in the apparatus of FIG. 2, the amount of oxidizing gas and catalyst are controlled so that the amount of oxidizing gas passing into zone 25 is greater than that required to convert all the coke on the catalyst in this zone to carbon dioxide, and the amount of oxidizing gas passing upwardly from zone 25 into zone 10 together with the oxidizing gas added to zone 10 from line 21 is insufficient to convert all the coke in zone 10 to carbon dioxide. Zone 10 therefore will contain some CO, and possibly some $Cl_2$ where a metal chloride is added to regenerator 9 or a portion of the system where $Cl_2$ formed will pass into this zone. If sufficient $Cl_2$ is formed (greater than about 100 ppm), this gas will reduce the tendency of CO to oxidize to $CO_2$. Other portions of the system to which metal compounds may be added to caot the heavy metals include the riser 2, stripper 14 or 35, line 26, bed 16, in the dilute phase above bed 16 and in line 36. Powdered metal compounds may be introduced into the regenerator through lines 30 or 31, either along or intimately mixed with makeup catalyst.

A particularly preferred embodiment is described in FIG. 3 where reference numeral 80 identifies a feed control valve in feedstock supply pipe 82. Supply pipe 83 (when used) introduces liquid water and/or an additive solution into the feed. Heat exchanger 81 in supply pipe 82 acts as a feed preheater, whereby preheated feed material may be delivered to the bottom of a riser type reactor 91. Catalyst is delivered to the reactor through catalyst standpipe 86, the flow of catalyst being regulated by a control valve 87 and suitable automatic control equipment (not shown) with which persons skilled in the art of designing and operating riser type cracking units are familiar.

The reactor is equipped with a disengagement vessel 92 similart to the disengagement vessel 3 of the reactor shown in FIG. 2. Catalyst departs disengagement vessel 92 through stripper 94. Spent catalyst passes from stripper 94 to regenerator 101 via spent catalyst transfer pipe 97 having a slide valve 98 for controlling flow.

Regenerator 101 is divided into upper chamber 102 and lower chamber 103 by a divider panel 104 intermediate the upper and lower ends of the regenerator vessel. The spent catalyst from transfer pipe 97 enters upper chamber 102 in which the catalyst is partially regenerated. A funnel-like collector 106 having a bias-cut upper edge receives partially regenerated catalyst from the upper surface of the dense phase of catalyst in upper chamber 102 and delivers it, via drop let 107 having an outlet 110, beneath the upper surface of the dense phase of catalyst in lower chamber 103. Instead of internal catalyst drop leg 107, one may use an external drop leg, such as shown in FIG. 6. Valve means in such external drop leg can control the residence time and flow rate in and between the upper and lower chambers. Make up catalyst and/or catalyst or regenerator additives may be added to the upper chamber 102 and/or the lower chamber 103 through addition lines 99 and 100 respectively.

Air is supplied to the regenerator through an air supply pipe 113. A portion of the air travels through a branch supply pipe 114 to bayonet 115 which extends upwardly into the interior of plenum 111 along its central axis. Catalyst in chamber 103 has access to the space within plenum 111 between its walls and bayonet 115. A smaller bayonet (not sown) in the aforementioned space fluffs the catalyst and urges it upwardly toward a horizontally arranged ring distributor (not shown) adjacent the open top of plenum 111 where it opens into chamber 103. The remainder of the air passing through air supply pipe 113 may be heated in air heater 117 (at least during start-up with VGO) and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop leg 107. The amount of air supplied is sufficient so that the resultant combustion gases are still able to support combustion upon reaching the top of chamber 103 and entering chamber 102. Drop let 107 extends through an enlarged aperture in panel 104, to which is secured a gas distributor 120 which is concentric with and surrounds a drop leg. Combustion supporting gases from chamber 103, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102. Supplemental air or cooling fluids may be introduced into upper chamber 102 through a supply pipe 122, which may also discharge through gas distributor 120.

Fully regenerated catalyst with less than about 0.25% carbon, preferably less than about 0.1% and more preferably less than about 0.05%, is discharged from lower regenerator chamber 103 through regenerated catalyst stripper 128, whose outlet feeds into catalyst standpipe 36. Thus, regenerated catalyst is returned to riser 91 for contact with additional fresh feed.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of coke for return to the riser.

Because of the arrangement of the regenerator, coked catalyst from transfer line 97, with a relatively high loading of carbon, contacts in chamber 102 combustion supporting gases which have already been at least partially depleted of oxygen by the burning of carbon from partially regenerated catalyst in lower chamber 102. Because of this, it is possible to control both the combustion of carbon and the quantity of carbon dioxide produced in upper regeneration chamber 102. Although regenerating gas introduced through air supply pipe 113 and branch conduit 114 may contain relatively large quantities of oxygen, the partially regenerated catalyst which is contacts in lower chamber 103 has already had a major portion of its carbon removed. The high oxygen concentration and temperature in chamber 103 combine to rapidly remove the remaining carbon in the catalyst, thereby achieving a clean, regenerated catalyst with a minimum of heat release. Thus, here again, the combustion temperature and the ratio of $CO_2$ to CO in the lower chamber are readily controlled. The regeneration off gases are discharged from upper chamber 102 via gas pipe 123, regulator valve 124, catalyst fines trap 125 and outlet 126.

The vapor products from disengagement vessel 92 may be processed in any convenient manner such as by discharge through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to an overhead receiver 142 having a bottoms line 143 feeding into pump 144 for discharging gasoline product. A portion of this product may be returned to the fractionator via recirculation line 145, the flow being controlled by valve 146. The receiver 142 also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and above material in the gas stream may be separated by compression, cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gase readily passes therethrough into zone 102. However, the perforations are sized so that the pressure difference between the upper and lower zones prevents catalyst particles from passing downwardly through the distributor. The bayonet 115 and distributor are similarly sized. Gases exiting the regenerator comprise combustion products, nitrogen, steam formed by combustion reactions and/or from vaporizing water added to the regenerator, and oxides of sulfur and other trace elements. These gases are separated from suspended catalyst particles by a cyclone separator (not shown) and then pass out of the regenerator through discharge conduit 123.

While this invention may be used with single stage regenerators, or with multiple stage regenerators which have basically concurrent instead of countercurrent flow between combustion gases and catalyst, it is especially useful in regenerators of the type shown in FIGS. 2 and 3, which have countercurrent flow and are well-suited for producing combustion product gases having a low ratio of $CO_2$ to CO, which helps lower regeneration temperatures in the presence of high carbon levels.

The metal additives of the invention may be introduced directly into the conversion system, such as through lines 83, 99 and/or 100 of FIG. 3. As an alternative, a side or "slip" stream of nickel and vanadium containing catalyst may be taken from the regenerator, cooled to near ambient conditions, and treated with a solution containing an organic or inorganic compound of one or more of the specified metals. Various flow schemes for treating a slip stream are illustrated in FIGS. 4, 5, 6 and 7.

With reference to FIG. 4, coked catalyst from the reactor via a stripper (not shown) is fed to the regenerator 160 through coked catalyst standpipe 172. Partially regenerated catalyst is transferred from first stage 173 (oxygen deficient) to second stage 174 (excess oxygen) by means of an internal drop leg 175. Fully regenerated catalyst then passes from the second stage to the reactor by means of a regenerated catalyst standpipe 176 which may also contain a stripper (not shown).

Catalyst from the first stage of regenerator 160 is fed to a slip stream treatment vessel 161 via slip line 162 containing slide valve 163. After treatment, the treated catalyst is returned to the second stage of the regenerator by an air lift line 166 fed by treated catalyst standpipe 164 containing slide valve 165. During treatment at near ambient conditions with the metal compound solution, (M. Cpd.), valves 163 and 165 are closed and vessel 161 filled with the treating solution through a line 167. After a soaking period of sufficient duration to thoroughly impregnate the porous catalyst particles, the solution is drained off through line 168 by means of appropriate valving (not shown). After the solution has been separated from the catalyst, the catalyst is dried by hot air, which is introduced through line 169 and vented through line 170, and the dried catalyst is returned to the second stage of the regenerator by opening valve 165 which allows the dried catalyst to be carried into the regenerator by air fed to air lift 166 through line 171. The cycle may then be repeated by closing valve 165 and opening valve 163 to introduce a new batch of metal contaminated catalyst into the vessel 161.

Each of the FIGS. 5, 6 and 7 contain components corresponding to those of FIG. 4 and for purposes of simplicity many of the common components are identified by an appropriate label and need not be discussed further. However, each of these figures represents a change in configuration as discussed below.

In FIG. 5, the regenerator has an external drop leg 180 through which catalyst is transferred from the first stage to the second stage of the regenerator. In this embodiment, catalyst is fed to the slip vessel from external dropleg 180. After the partially regenerated catalyst has been treated with the metal compound solution, separated from that solution and dried with hot air, it is transferred to the second stage of the regenerator along with dropleg catalyst by means of auxilliary air lift line 182 and main airlift line 184.

In FIG. 6, fully regenerated catalyst is stipped in stripper 190 and fed to the slip vessel through a downstream slip line 192. After the catalyst is treated with the metal compound solution, separated from that solution and air dired, it is returned to the regenerated catalyst standpipe upstream of stripper 190. As a further alternative, airlift line 194 could instead return the treated catalyst to the dropleg airlift 195, directly to the second stage of the regenerator, and/or to the regenerated catalyst standpipe downstream of stripper 190.

FIG. 7 illustrates a further embodiment by which the treated catalyst may be left in a wet condition and the wet catalyst transferred by gravity to the regenerated catalyst standpipe where it is dried by contact with hot regenerated catalyst. In this embodiment, fully regenerated catalyst from an auxilliary standpipe 200 is airlifted by means of airlift line 202 into the slip vessel for treatment with the metal compound solution. After treatment of the slip catalyst in the slip vessel, the treated catalyst is separated from the metal compound solution by draining off the solution through drain line 204. The wet catalyst may then be fed directly to the regenerated catalyst standpipe through return line 206. As a further alternative and with appropriate valving in airlines 208 and 210 as shown, the wet catalyst charge may be either partially or completely air dried before being discharged to the regenerated catalyst standpipe.

Where a slip stream from the regenerator is treated with the metal compound solution, it is preferable that the catalyst be regenerated to the extent that the weight percent coke remaining on the catalyst is less than about 0.5, preferably less than about 0.25 and most preferably less than about 0.05. A preferred treatment solution is an aqueous solution containing an aluminum salt and ammonia. Ammonia is utilized to hydrolyze the aluminum salt so as to form aluminum trihydroxide, $Al(OH)_3$. When impregnated with this solution, heavy metals on the catalyst become coated with aluminum trihydroxide. The coated catalyst is then fed, either wet or dried, to the second stage of the regenerator or to the regenerated catalyst standpipe where the aluminum trihydroxide coating is calcined to yield alumina, $Al_2O_3$, which may react with the heavy metals to form aluminate spinels at the heavy metals to alumina interface. Subsequent layers of alumina may also be formed on top of the initial spinel coating at the interface. Even if a spinel is not formed at the calcining conditions, the heavy metals will at least be coated with one or more layers of alumina. The formation of spinels is favored at high regenerator temperatures and in order to induce spinel formation, the temperature of catalyst in the last stage of the regenerator and/or in the regenerated catalyst standpipe is preferably at least 1200° F. and more preferably 1300° F. or higher.

Instead of using an ammoniacal solution, slip catalyst at near ambient conditions may be treated with an aluminum, silicon, zirconium or titanium salt of an organic acid, such as an acetate or stearate. These organic salts then decompose in the regenerator or regenerated catalyst standpipe so as to coat the heavy metals with the additive metal or metals. As a further alternative, organic compounds containing the desired metal component, e.g., aluminum, may be used to exchange additive metal ions for heavy metal ions on the catalyst, the exchanged heavy metals, e.g., nickel and vanadium, then being drained off with the organic treating solution.

Ammoniacal and/or ion exchange types of treating solutions are preferably used at near ambient conditions so that the solution can be drained from the catalyst before it is returned to the conversion system. In this manner, undesirable components in the treating solution which may be detrimental either to the catalyst or to the conversion process, such as ammonia and/or exchanged heavy metals, are removed before the catalyst is returned to the conversion system. Various techniques for isolating a slip stream batch of catalyst, treating it with solutions at near ambient conditions, and draining off the treatment solution before the catalyst is returned to the conversion system are illustrated in FIGS. 4 through 7. However, where the treatment solution does not contain components which might be detrimental to the catalyst or the conversion process, the solution may be added to a moving slip stream wherein catalyst is continuously drawn off and returned to the regenerator. In this latter alternative, the slip vessels illustrated in FIGS. 4 through 7 would serve as surge vessels for contacting a fluidized volume of flowing hot catalyst with the treating solution as slip catalyst continuously passes through the slip system. When treating a continuous slip stream of hot catalyst, the liquid component of the treating solution vaporizes almost instantaneously upon contacting hot catalyst so as to deposit the metal additive on catalyst particles in the slip stream. One advantage of this arrangement is that the heat of vaporization of the liquid can be used to help control the temperature of the highly exothermic combustion reaction in the regenerator. One disadvantage of contacting very hot catalyst is that a portion of the treating solution may be solidified before the catalyst particles can be impregnated with the additive metal compounds.

Having thus described this invention, the following Examples are offered to illustrate the invention in more detail.

EXAMPLE 1

A carbo-metallic feed at a temperature of about 450° F. is introduced at a rate of about 2070 pounds per hour into the bottom zone of a vented riser reactor where it is mixed with steam, water and a zeolite catalyst at a temperature of about 1275° F. The catalyst to oil ratio by weight is about 11 to 1.

The carbo-metallic feed has a heavy metal content of about 5 parts per million nickel equivalents which is comprised of about 3 ppm nickel and about 10 ppm vanadium. This feed has a sulfur content of about one percent and a Conradson carbon content of about 7 percent. About 85 percent of the feed boils above 650° F. and about 20% of the feed boils above 1025° F.

The water and steam are injected into the riser at a rate of about 103 and 240 pounds per hour respectively. The temperature within the reactor is about 1000° F. and the pressure is about 27 psia. The partial pressure of feed and steam are about 11 psia and 16 psia respectively.

Within the riser about 75 percent of the feed is converted to fractions boiling at a temperature less than 430° F. and about 53 percent of the feed is converted to gasoline. During the conversion 11.2 percent of the feed is converted to coke containing 5.3 percent hydrogen.

The catalyst containing about one percent by weight of coke and about 0.01 percent sulfus is removed from the reactor and introduced into a stripper where it is contacted with steam at a temperature of about 1000° F. to remove volatiles adsorbed onto the catalyst. The stripped catalyst is introduced into the upper zone of a two-zone regenerator as shown in FIG. 1 at a rate of 23,000 pounds per hour. Each zone contains about 4000 pounds of catalyst for a total catalyst inventory of about 8000 pounds. Air is introduced into the lower zone at a rate of about 1400 pounds per hour. The lower zone produces 85 pounds of $CO_2$ per hour and no measurable amount of CO, and is at a temperature of about 1340° F.

Air is introduced into the upper zone at a rate of about 1200 pounds per hour together with flue gases from the lower zone. The upper zone produces 540 pounds of $CO_2$ per hour and 112 pounds of CO per hour, and it is at a temperature of about 1330° F.

The regenerator flue gases contain 3400 ppm sulfur oxides and $CO_2$ and CO in a mol ratio of 3.6. The catalyst removed from the lower zone is recycled to the reactor riser contains about 0.03 percent coke by weight.

EXAMPLE 2

In this example, the metal compound of the invention is not added until after the catalyst has attained equilibrium with a heavy metals loading of about 10,000 ppm Nickel Equivalents which is comprised of about 6,000 ppm nickel and about 20,000 ppm vanadium. The process conditions are the same as Example 1 except that equilibrium catalyst is replaced with fresh catalyst at a rate sufficient to maintain the heavy metals level at 10,000 ppm Nickel Equivalents, and powdered aluminum chloride is added to the regenerator at a rate of 43 pounds per hour until the concentration of aluminum on the catalyst reaches about 10,000 ppm, i.e., a one to one atomic ratio of aluminum to nickel plus vanadium. As there is a total of 208 pounds of heavy metals (nickel and vanadium) on the catalyst inventory of 8,000 pounds, the total amount of aluminum chloride required to achieve 10,000 ppm aluminum at equilibrium is about 1040 pounds. At an addition rate of 43 pounds per hour, approximately 24 hours are needed to reach this equilibrium level of aluminum. After the aluminum level on the catalyst reaches 10,000 ppm, the rate of addition of aluminum chloride is then reduced to between about 0.14 and about 0.4 pounds per hour in order to passivate the additional heavy metals being introduced with fresh feed, which contains about 5 ppm Nickel Equivalents comprised of about 3 ppm nickel and about 10 ppm vanadium. The lower equilibrium addition rate of 0.14 pounds per hour is sufficient to maintain approximately a one to one atomic ratio of aluminum to heavy metals in the feed and also to replace the amount of additive metal compound lost with catalyst fines. The upper equilibrium addition rate of 0.4 pounds per hour is sufficient to maintain about 115 ppm chlorine in the flue gas so as to control the $CO_2/CO$ ratio at about 2.5. The one to one atomic ratio of aluminum to the heavy metals on the catalyst raises the level of feed converted to gasoline to 54 volume percent or greater.

Although the aluminum additive of this example is added to the regenerator to take advantage of the chlorine generated therein, the additive compound may instead be added to the oil feed in line 1 of the apparatus of FIG. 2 or in line 82 of the apparatus of FIG. 3 so that the aluminum and the heavy metals in the feed will be deposited on the catalyst as an intimate mixture. Such physical admixture is more effective in tying up the nickel and vanadium in aluminate spinels which may be formed in the regenerator. As aluminum chloride tends to form hydrogen chloride in the reducing atmosphere of the riser and this acid compound may damage catalyst separation and other downstream equipment, aluminum added to the oil feed is preferably in the form of aluminum sulfate (Alum) or aluminum chloride hexahydrate (HEXA). Although chlorine is present in aluminum chloride hexahydrate, this compound is more stable in the riser and does not form significant amounts of hydrogen chloride. Both aluminum sulfate and aluminum chloride hexahydrate are very soluble in water and at the addition rates required, these additive metal compounds may be mixed with the 103 pounds per hour of water added to the riser as set out in Example 1.

solution viscosity, the concentration of the aluminum compound in water should not exceed about 40 to 50 weight percent.

TABLE 3

| | | Rate of Aluminum Compound Addition to Feed for Examples 3-10 | | | | |
|---|---|---|---|---|---|---|
| Water Addition (Wgt. % of Feed) | lbs. Water per hour | Wgt Ratio Al to Ni + V in Feed | Amt. of Alum req'd (lbs/hr) | Wgt. % of Alum in water | Amt. of HEXA req'd (lbs/hr) | Wgt. % HEXA in Water |
| 5 | 28,000 | 1:1 | 1,100 | 4 | 1,552 | 5.5 |
| 5 | 28,000 | 2:1 | 2,200 | 8 | 3,104 | 11.1 |
| 10 | 56,000 | 1:1 | 1,100 | 2 | 1,552 | 2.8 |
| 10 | 56,000 | 2:1 | 2,200 | 4 | 3,104 | 5.6 |

TABLE 4

| | | Rate of Aluminum Compound Addition to Feed for Examples 11-14 | | |
|---|---|---|---|---|
| Water Addition (Wgt. % of Feed) | lbs. Water per hour | Wgt Ratio Al to Ni + V in Feed | Amt. of HEXA req'd (lbs/hr) | Wgt. % of HEXA in water |
| 5 | 28,000 | 1:1 | 65 | 0.23 |
| 5 | 28,000 | 2:1 | 130 | 0.46 |
| 10 | 56,000 | 1:1 | 65 | 0.12 |
| 10 | 56,000 | 2:1 | 130 | 0.23 |

EXAMPLES 3-10

In these examples, 40,000 barrels per day of fresh feed are fed to a riser conversion system of the type illustrated in FIG. 3 having a catalyst inventory of about 80 tons (2 tons of inventory per 1,000 barrels of feed). The catalyst inventory equilibriates with about 10,000 Nickel Equivalents of heavy metals on the catalyst, of which about 6,000 ppm is nickel and about 20,000 ppm is vanadium. At these heavy metals levels, the catalyst inventory carries about 960 pounds of nickel and about 3,200 pounds of vanadium for a total inventory of nickel plus vanadium of 4,160 pounds. This heavy metals inventory requires about 26,330 pounds of Alum or 37,144 pounds of aluminum chloride hexahydrate for a 1:1 aluminum to heavy metals ratio on the catalyst, or 52,660 pounds of Alum or 74,288 pounds of aluminum chloride hexahydrate for a 2:1 aluminum to heavy metals ratio on the catalyst. Assuming that these quantities of the specified aluminum compounds are to be added to the riser as a water solution mixed with the feed, Table 2 gives the amount of water and the concentration of the aluminum compound in the water to be added to the feed over a 24 hour period.

If a shorter addition time is desired, the rate of addition of the aluminum compound is increased by the proportion that 24 hours bears to the shorter period desired in hours. For example, if the addition is to be completed within 12 hours, either the concentration of the compound in the water or the rate of solution addition (but not both) would be doubled. From a practical standpoint with regard to compound solubility and

EXAMPLES 11-14

As previously explained, it is preferably to intimately mix the additive metal compounds with the oil feed and to introduce this mixture into the riser from the beginning of operations with fresh catalyst so that the additive metal is intimately mixed with heavy metal deposits at the time the catalyst reaches equilibrium. Examples 11-14 illustrate this embodiment of the invention. These examples are also based on a feed rate of 40,000 barrels per day and a heavy metals content of about 5 ppm Nickel Equivalents comprised of about 3 ppm nickel and about 10 ppm vanadium, but are independent of catalyst inventory since both the heavy metals and the metal component (aluminum) of the additive compound are deposited on the catalyst together at the desired atomic ratio and will accumulate to those equilibrium levels corresponding to the rate of catalyst replacement. Thus, these examples are also independent of the level of heavy metals on the catalyst at equilibrium because, regardless of the level attained, the additive metal component will already be present on the catalyst in the desired atomic ratio. The rates of addition of aluminum sulfate (Alum) or of aluminum chloride hexahydrate (HEXA) required to attain equilibrium weight ratios of 1:1 and 2:1 of aluminum to heavy metals in the feed and on the catalyst at different water addition rates and different metal additive concentrations are illustrated in Table 3. With reference to this table, a 1:1 weight ratio of aluminum to nickel plus vanadium is equivalent to an atomic ratio of about 2:1 and a 2:1 weight ratio of aluminum to nickel plus vanadium is equivalent to about a 4:1 atomic ratio. At the given levels of heavy metals in the feed, 40,000 barrels of feed per day introduces about 40.3 pounds of nickel and about 134.4 pounds of vanadium per day into the system for a total daily heavy metals inventory of about 174.7 pounds which is transferred almost quantitatively to the catalyst inventory under the riser conversion conditions specified in Example 1.

At the levels of aluminum addition specified in Table 3, the overall level of conversion is increased by about 1 to 5 volume percent and gasoline selectivity is increased by about 1 to 10 volume percent at equilibrium conditions relative to the same process carried out in the same conversion apparatus at the same conversion conditions, but without the addition of the aluminum additive to the feed.

What is claimed is:

1. In a process for catalytically converting carbo-metallic containing residual oil feeds to produce transportation grade fuels comprising gasoline boiling range material whereby coke and metal contaminants of nickel and vanadium are deposited on the catalyst particles and the catalyst particles are regenerated by burning coke deposits in a catalyst regeneration operation, the improved method of operation for reducing coke and gas make during said catalytic conversion of said residual oil feeds and passivating within a 24-hour period an accumulation of nickel equivalent of heavy metals within the range of 3000 to 10,000 ppm on the cracking catalyst which comprises, adding a sufficient amount of an aluminum and/or silicon compound to said catalyst comprising greater than 3000 ppm nickel equivalents within said 24-hour period to passivate metal contaminants and provide at least a 1:1 ratio between said added aluminum and/or silicon compound and said accumulated heavy metals nickel equivalent contaminants and thereafter reducing the rate of addition of the added metal compound to said catalyst to provide a weight ratio relative to the nickel equivalent of heavy metals in the residual oil feed within the range of 1.5 to 4.

2. The process of claim 1 wherein the metal compound of aluminum and/or silicon is added in an aqueous solution with the residual oil feed, in a hydrocarbon solvent mixable with the oil feed or as a powder to the catalyst.

3. The method of claim 2 wherein the solvent is selected from the group consisting of virgin gas oil; light cycle oil; heavy gas oil; naphtha; alcohols; aromatic materials and organic solvents comprising acetates, alcoholates, stearates, phenolates, naphthenates, esters, carboxylates and dienyl sandwich compounds.

4. The method of claim 1 wherein the aluminum or silicon metal compound is selected from the group of compounds consisting of compounds of silicic acid, aluminum isopropoxide, aluminum acetate, aluminum alcoholates, silanes and silicates comprising an alkyl or aryl group.

5. The method of claim 1 wherein said added metal compound is added to the hydrocarbon conversion operation as particulate solids or as an aqueous solution of water soluble inorganic salts such as acetates, chlorides, nitrates, sulfates, sulfites and/or carbonates of the added metals.

6. The method of claim 1 wherein the added metal compound is added to one or more of (a) the hydrocarbon conversion operation, (b) the catalyst regeneration operation, (c) a catalyst stripping zone intermediate the hydrocarbon conversion operation and the catalyst regeneration operation, (d) to a regenerated catalyst standpipe intermediate two stages of catalyst regeneration, (e) to a portion of the catalyst passed from one stage of catalyst regeneration to the second regeneration stage and (f) to a portion of the catalyst recovered from the final stage of catalyst regeneration before passage to hydrocarbon conversion.

7. The method of claim 1 wherein a portion of the added metal compound is a chloride introduced to said regeneration operation in an amount providing a chlorine concentration in the flue gas in the range of 100 ppm up to about 400 ppm.

8. The method of claim 7 wherein the concentration of chlorine in the flue gas is within the range of 100 to 300 ppm.

9. The method of claim 1 wherein the added metal compound is sufficient to increase the gasoline yield by an amount in the range of 1 to 10 volume percent.

10. The method of claim 1 wherein aluminum sulfate is added to said hydrocarbon conversion step and aluminum chloride hexahydrate is added to said catalyst regeneration step.

11. The method of claim 10 wherein said aluminum compound is added on a weight ratio basis relative to the heavy metals in in the oil feed and/or on the catalyst in the range of 1.5 to 2.0.

12. The method of claim 1 wherein the residual oil feed contains at least 4 ppm of nickel equivalent of heavy metal of which at least about 2 ppm is nickel.

13. The method of claim 1 wherein the catalytic conversion of the residual oil feed is accomplished with a catalyst comprising at least 15 percent by weight of a crystalline zeolite.

14. The method of claim 1 wherein the added metal compound of aluminum and/or silicon is added to the stage of catalyst regeneration of highest oxygen concentration.

15. The method of claim 1 wherein the added metal compound of aluminum and/or silicon is added to all or a portion of the catalyst passed from a first stage of catalyst regeneration to a second stage of catalyst regeneration.

* * * * *